US012793306B1

(12) United States Patent
Muaz et al.

(10) Patent No.: US 12,793,306 B1
(45) Date of Patent: Nov. 10, 2026

(54) TECHNIQUES FOR GENERATING REALISTIC AVATAR VIDEOS

(71) Applicant: Amazon Technologies, Inc., Seattle, WA (US)

(72) Inventors: Urwa Muaz, London (GB); Baris Gecer, London (GB); Brandon Michael Smith, Fremont, CA (US); Ganesh Subramanian Iyer, Cupertino, CA (US); Walterio Wolfgang Mayol Cuevas, Seattle, WA (US); Nicolas Heron, New York, NY (US); Godagamage Cissie Kushith Amerasinghe, Santa Rosa, CA (US)

(73) Assignee: Amazon Technologies, Inc., Seattle, WA (US)

( * ) Notice: Subject to any disclaimer, the term of this patent is extended or adjusted under 35 U.S.C. 154(b) by 122 days.

(21) Appl. No.: 18/615,787

(22) Filed: Mar. 25, 2024

(51) Int. Cl.
*G06T 13/20* (2011.01)
*G06Q 30/0601* (2023.01)
*G06T 13/40* (2011.01)
*G06T 15/04* (2011.01)
*G10L 13/02* (2013.01)

(52) U.S. Cl.
CPC ....... *G06T 13/205* (2013.01); *G06Q 30/0623* (2013.01); *G06T 13/40* (2013.01); *G06T 15/04* (2013.01); *G06T 2200/24* (2013.01); *G06T 2210/16* (2013.01); *G10L 13/02* (2013.01)

(58) Field of Classification Search
CPC ... G06T 13/205; G06T 13/40; G06Q 30/0601; G06Q 30/0631
See application file for complete search history.

(56) References Cited

U.S. PATENT DOCUMENTS

2003/0156134 A1* 8/2003 Kim ..................... G06Q 10/107 715/753
2010/0100916 A1* 4/2010 Clayton ........... H04N 21/47815 709/224
2018/0315117 A1* 11/2018 Jephcott ................ G06T 19/006
2024/0046341 A1* 2/2024 Ananthakrishnan .... G06F 3/011
2026/0004114 A1* 1/2026 Kim ..................... G06N 3/0475

OTHER PUBLICATIONS

U.S. Appl. No. 18/615,662, Patent Application, "Techniques for Generating Scalable Talking Avatars", filed Mar. 25, 2024, 39 pages.

* cited by examiner

*Primary Examiner* — King Y Poon
*Assistant Examiner* — Vincent Peren
(74) *Attorney, Agent, or Firm* — Kilpatrick Townsend & Stockton LLP

(57) ABSTRACT

Techniques are disclosed for generating a video demonstrating an item. A server device can implement an avatar video pipeline that includes one or more models for producing generative content from text input. The server device can receive an identifier for an item and obtain item information including an item description for the item. The server device can use the item information to generate a script for the video. The script can include text to be spoken in the video. The server device can use the script to generate an avatar for the video demonstration. The avatar can be animated to speak in accordance with a portion of the script and perform at least one gesture. The server device can also use the item information to generate a background scene and then generate the video that includes an image representation of the item and the avatar positioned within the background scene.

20 Claims, 13 Drawing Sheets

TECHNIQUES FOR GENERATING REALISTIC AVATAR VIDEOS

BACKGROUND

Generative artificial intelligence (AI) continues to make transformative strides for the production of realistic video content, including depictions of close-to-lifelike humans. The models underlying the generative AI are sophisticated and can require substantial computing resources to harness. In addition, composing contextually relevant video content conventionally requires substantial user guidance. As the demand for more realistic, customizable, and ad hoc video content increases, there is an increasing need for efficient implementations of generative AI models to produce suitable content.

BRIEF DESCRIPTION OF THE DRAWINGS

Various embodiments in accordance with the present disclosure will be described with reference to the drawings, in which.

DETAILED DESCRIPTION

Figure 1:
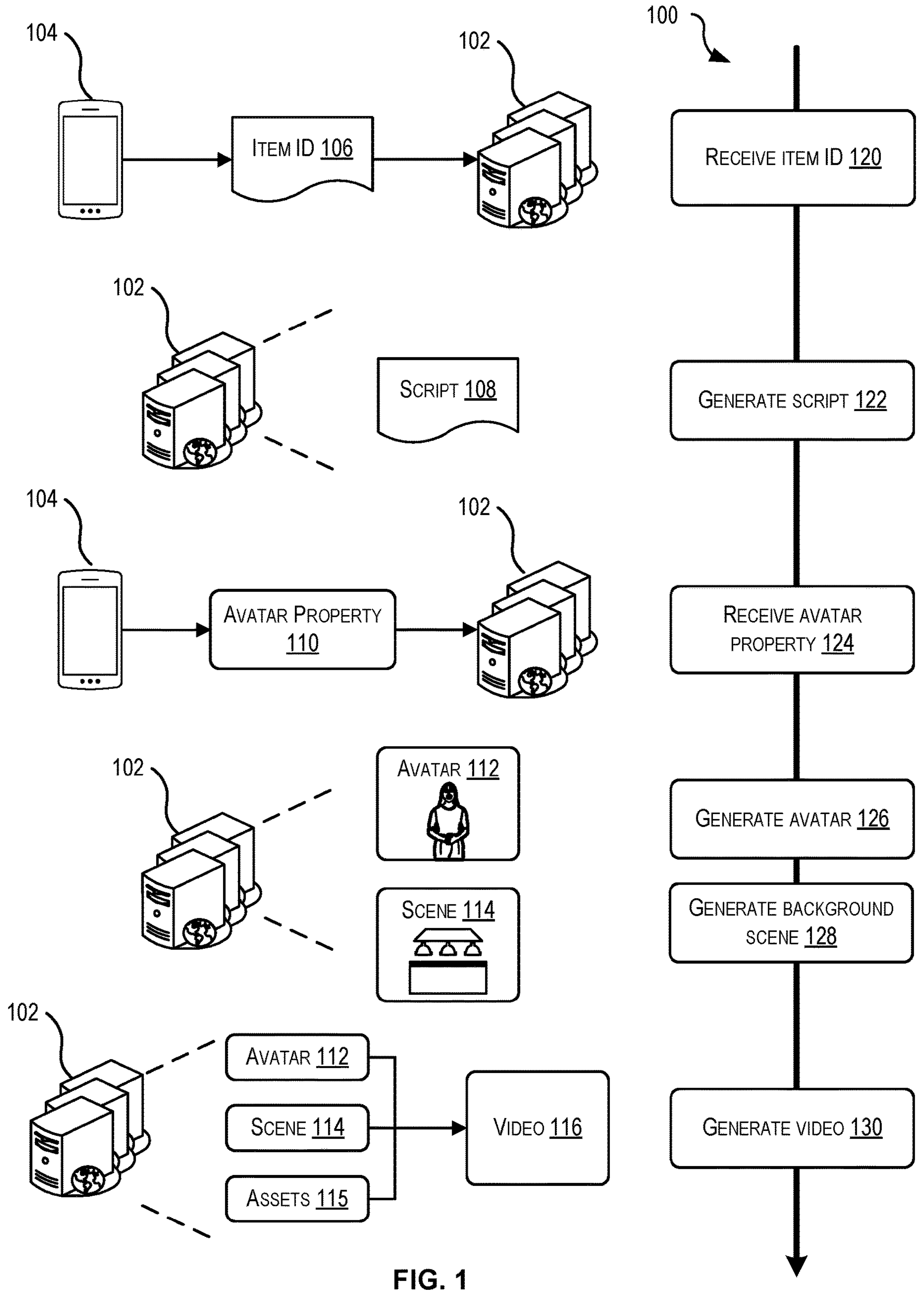
FIG. 1 is a block diagram and associated flow chart of an example process to generate a video demonstrating an item using an item identifier, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Recent developments in generative artificial intelligence (AI) have allowed for the production of a great variety of creative output, including textual information, images, and video. For example, large language models (LLMs) like GPT have been used to produce responsive and natural text output to various prompts, with the ability to convey information in a readable manner. As another example, multi-modal implementations of an LLM like GPT (e.g., DALL-E) have been configured to produce still images of scenes based on text inputs. These generative AI techniques can allow for the creation of complex outputs (e.g., detailed images, comprehensive text narratives) from relatively simple inputs.

Not all media has been amendable to generative AI methods. Video depicting photo-realistic scenes and realistic people tend to be susceptible to various technical inadequacies of conventional generative AI. For example, some conventional techniques may produce realistic looking people but fail to convincingly animate the motion of those people in the video, resulting in wooden gestures and mouth movements poorly synchronized with corresponding speech. Some other conventional generative AI techniques can produce videos depicting people with more fluid movements but with immediately noticeable and disconcerting physical distortions (e.g., hands with too many fingers, legs that appear to melt together while walking). Although these generative AI-produced videos can be created relatively quickly from limited input information, the surreal inaccuracies of their content can detract from any information conveyed in the video, particularly when the videos are conveying technical, educational, or descriptive information.

With respect to videos depicting realistic human avatars, recent advancements have developed efficient avatar generation techniques using diffusion models. These avatar generation techniques can create an avatar that both looks and speaks realistically, with accurate animations for the mouth and facial features corresponding to the spoken words. The avatar generation techniques can create avatars with a variety of appearances that need not correspond to any actual person. In addition, the particular generative models used in these avatar generation techniques can produce avatar outputs (e.g., complete talking avatar videos) more quickly and using fewer computational resources than conventional diffusion models and neural network models. Specific details of the avatar generation technology are provided in U.S. application Ser. No. 18/615,662, filed on Mar. 25, 2024, and titled "TECHNIQUES FOR GENERATING SCALABLE TALKING AVATARS," the contents of which are herein incorporated in their entirety for all purposes.

Even with a realistic talking avatar, much of the desired video content that can be produced with generative AI can benefit from improved avatar gestures and video composition methods that allow for the avatar to be positioned organically and realistically within a background scene and with gestures that appear natural to a viewer within the context of the scene and the information being presented by the avatar's speech. Changing camera views, perspectives, cut-aways, and other cinematic techniques can enhance the presentation of the avatar in the video and make for a more engaging viewing experience. Additionally, and in keeping with the concept that a generative AI system can produce complex outputs from relatively simple inputs, such a video generation system can generate an output video with a realistic avatar, placed in a realistic scene and performing both correctly animated speech and natural gestures, with visually interesting camera effects, using relatively few inputs.

Embodiments of the present disclosure are directed to techniques to generate a video with a realistic human avatar that both speaks and gestures in a realistic manner. In particular, the techniques described herein include a server device or similar computing system that can implement an avatar video pipeline that can take an item identifier and generate a video with a realistic avatar that can demonstrate the corresponding item with gestures. The avatar video pipeline includes a machine learning model (e.g., an LLM) that can generate a script from the item identifier, an avatar generation system that can create an avatar from the script, and a scene model (e.g., a diffusion model) that can generate appropriate background scenes and place the avatar in those background scenes in a realistic manner. The avatar video pipeline can also assemble additional video and image assets in the video and compose the video with a variety of camera effects (e.g., different fields of view, scene transitions, different camera angles) to produce a video that is appealing to a viewer. When generating the avatar video, the avatar video pipeline can obtain additional information about the item as well as user input to tailor the video to the item and customize the avatar. Additionally, the techniques described herein include a user device that can present a graphical user interface (GUI) for receiving the inputs to the avatar video pipeline and allowing a user to modify the script, avatar appearance, and details of the final video.

To illustrate with a specific example, an online service provider (e.g., an online retail service provider) may offer items for sale on an online platform. Each item may have a corresponding item identifier. The service provider can maintain item information for the item, including descriptions (e.g., product descriptions, technical specifications, etc.), images of the item, user feedback for the item (e.g., customer reviews, frequently asked questions and answers, etc.), and other information. Using the item identifier, a server device can obtain the item information and input it into the avatar video pipeline, in which one or more machine learning models including LLMs and diffusion models, can create a script for the advertisement, a realistic avatar that is animated to accurately read audio of the script as well as perform gestures indicating the item, and a background scene in which the avatar can be positioned to demonstrate the item. The video can be composed with various effects, including different camera angles and scene transitions, where the video composition is handled automatically by the avatar video pipeline using the script to infer a storyboard for the video. The advertisement is then the video of the avatar positioned in a realistic scene and demonstrating the item with speech from the script. Portions of the pipeline process may be exposed to a user via a GUI to allow the user to modify outputs of the avatar generation pipeline as they are generated, for example by making modification to the script that is initially generated from an LLM.

Although the specific example given above describes an advertisement for an item offered by an online service provider, the techniques described herein are not so limited. For example, an avatar video pipeline can create videos for educational or technical content, in which the "item" may be a selected topic and the avatar configured to clearly convey information about the selected topic in a realistic video. As other examples, the avatar video pipeline can create announcement videos for new products, tutorials for various tasks (e.g., home repair tasks, cooking/recipe instructions, etc.), and other descriptive or demonstrative content.

The techniques described herein can provide numerous technical advantages over conventional generative AI systems for producing video. For example, the avatar video pipeline can make use of trained generative models, particularly an avatar generation system, that can produce realistic avatars much more quickly and efficiently than conventional generative AI models. Conventional diffusion models applied to generating animated avatars produce avatars with unnatural and unrealistic movements of both face and gestures. The gestures are limited and do not correspond to either the context of the spoken content or any item displayed with the avatar. By contrast, the avatar video pipeline can create a video in which the avatar is realistic, moves in a natural way not distracting to a viewer, and is positioned in the scene in a way that allows for an emphatic demonstration of the item. Because the avatar videos are more realistic, they are better at delivering the informational content since viewers are more engaged with the video and not disconcerted by poorly animated avatars.

The techniques described herein also include a GUI for the avatar video pipeline that can improve user interactions with the GUI when compared to conventional UIs. For example, the GUI can present the script generated by the LLM to the user for modification before executing the avatar generation system, limiting unnecessary creation of avatars animated to speak dialog that is later changed by the user. In addition, the GUI can present one or more avatar templates that display one or more avatar properties corresponding to the appearance of the avatar that will be generated. The avatar templates may be determined based on the script, allowing the user to select from a template without having to manually specify details of the avatar appearance before executing the avatar generation system.

Turning now to the figures, FIG. 1 is a block diagram and associated flow chart of an example process 100 to generate a video demonstrating an item using an item identifier 106, according to some embodiments. The diagram shows elements of a computer system corresponding to the blocks of process 100. The process 100 can be performed by a computer system, which can include a server device 102 and a user device 104. Additional details about different computer systems that are capable of performing the techniques of the disclosure are provided below with respect to FIGS. 6 and 13. In some embodiments, the server device 102 may be a component of a system of a service provider that maintains item information for a catalog of items. The items can be, for example, items offered for sale on an online retail platform, educational content, technical content, instructions, and other collections of content that may be suitable for presentation in an avatar video. The server device 102 may also provide storage for videos generated by the avatar video pipeline as well as other assets used in the creation of the videos (e.g., gesture template videos, item images, item videos, etc.).

The process 100 may begin at block 120 with the server device receiving an item identifier 106. The item identifier 106 may be received from the user device 104. For example, a user initiating the video creation process can input an item identifier into a GUI presented at the user device 104. The item identifier 106 may be a token, string, identification number, or other value that can uniquely identify the associated item. The item identifier 106 can be usable by the server device 102 to obtain item information corresponding to the item.

At block 122, the server device 102 can generate a script 108 using the item identifier 106. The script 108 may be generated using a machine learning model like a LLM trained to produce a text script that includes a narrated description of an item. For example, item information corresponding to the item identifier 106 can be obtained and input into the LLM to produce the narration for an advertisement for the item. The server device 102 can use the item identifier 106 to retrieve the corresponding item information from a database or other data store for maintaining item information.

At block 124, the server device 102 can receive an avatar property 110. The avatar property 110 can be received from the user device 104. The avatar property 110 may be user input that specifies one or more aspects of the avatar to be included in the video for the item. For example, a user may input a text prompt into the user device 104 that includes a description of the desired avatar for the video. As another example, the user device 104 may present a selection of avatar templates that each depict a different avatar characterized by an avatar property. The user may select one of the avatar templates for use when generating the avatar. The user device 104 can send an indication of the selection to the server device 102. In some embodiments, the user device 104 may present additional avatar property customization elements at the GUI. For example, the GUI may present sliders or similar graphical elements for adjusting properties of an avatar's appearance. The user can interact with these elements to specify the avatar property that is sent to the server device 102.

At block 126, the server device 102 can generate an avatar 112. As used herein, an avatar like avatar 112 can include computer code and associated data that represents a visual depiction of a human avatar being in a video and/or still image frames. The avatar 112 can include full body depictions (e.g., including head to feet) or partial body depictions (e.g., waist up) within a scene of the video. As described in more detail below with respect to FIG. 3, the server device 102 can include an avatar generation system that implements one or more components for generating an avatar. Each component can be configured to determine a portion of the of the avatar's appearance and movement for the video. For example, the avatar generation system can include a gesture component that can determine one or more gestures for the avatar to perform in the video. If the script 108 includes a portion where the item is named, the avatar generation system can determine that a gesture that points to the item should occur at the same time that the avatar 112 speaks the item name. The avatar generation system can take as inputs the avatar property as well as audio produced from the script 108. For example, the TTS system can be used to generate audio from the script 108, and the avatar can be animated to speak the words of the script 108 synchronized to the audio in a realistic manner.

At block 128, the server device 102 can generate a background scene 114. The background scene 114 can include images depicting the setting of the video in which the avatar may be positioned during the video. The server device 102 can implement a machine learning model like a diffusion model to generate the background scene 114 based on inputs from the script 108. For example, the script 108 can identify that the item is a kitchen appliance, so that the background scene may depict a kitchen in which the avatar may be positioned in the video. The scene model can also be configured to embed the avatar 112 within the background scene 114. Conventional generative techniques may simply overlay an animated object like an avatar over a static background. The scene model implemented by the server device 102 can position the avatar 112 realistically within the background scene 114 so that foreground elements of the scene are in front of a portion of the avatar 112.

At block 130, the server device can generate the video 116 demonstrating the item. The server device 102 can implement a video composer that can produce the video 116. The video composer can obtain additional assets 115 to include in the video 116. For example, the item information maintained by the service provider can include images of the item that can be used in the video 116 as a representation of the item. The additional assets 115 can also be used for cutaway shots in the video 116. The video composer can also be configured to apply various camera effects to the video 116. For example, with the avatar 112 in the background scene 114, the field of view of the scene can be adjusted to have close shots or wide shots or different depths of field for different portions of the video 116. The pose of the virtual camera can also be adjusted to simulate tilt and pan of the scene to provide movement for the video 116. The video composer can also add sound effects, scene transitions, and text overlays in the video 116. The video composer can use the script 108 to determine what effects should be used and when the effects should be applied. For example, the script 108 may have broken the narration for the item into three distinct scenes. At a transition from one scene to the next, the video composer can add a camera effect to slowly pan toward a different view of the item while the avatar 112 provides the audio narration. Additional detail of the video composer is provided below with respect to FIG. 4.

Figure 2:
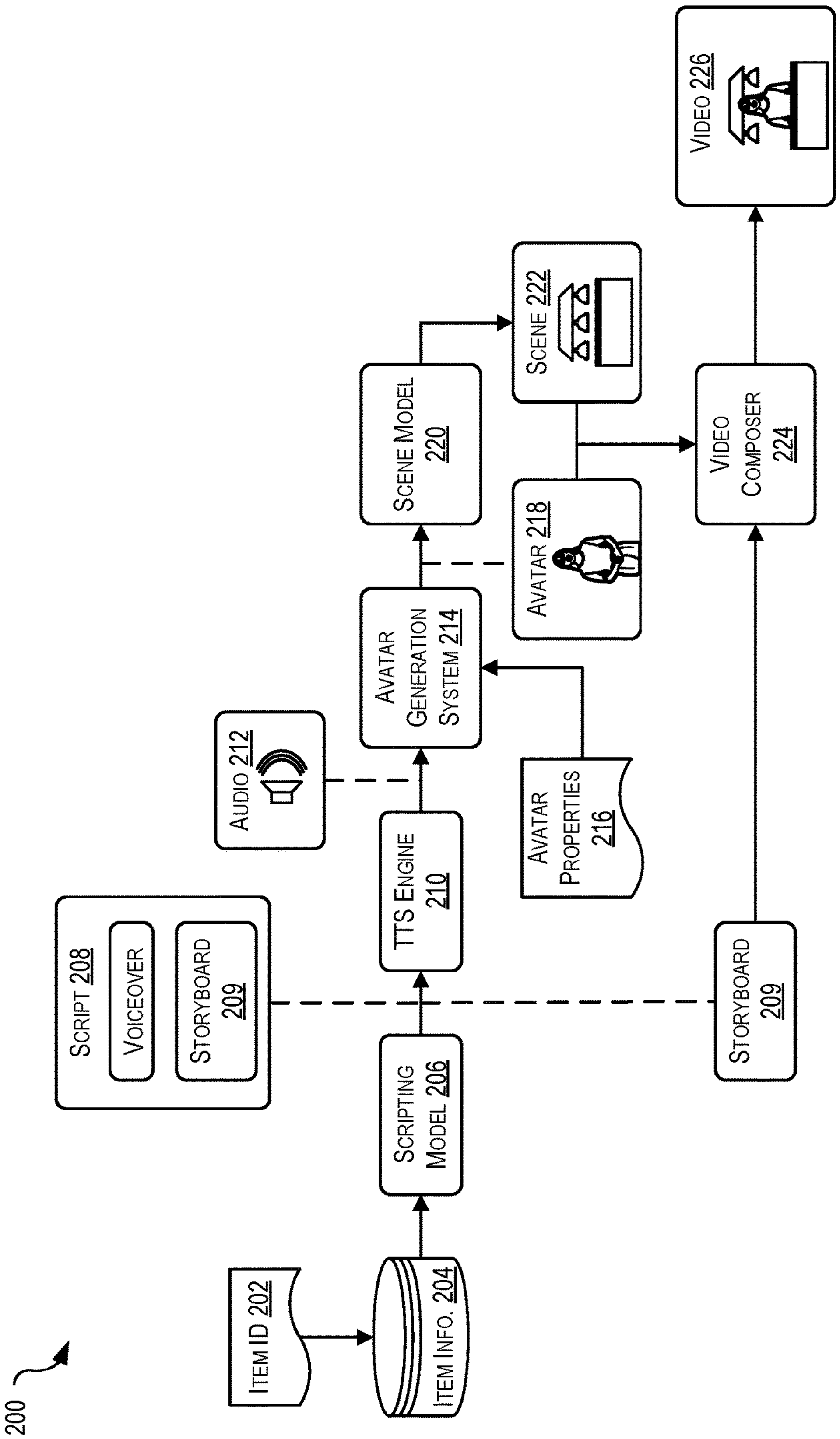
FIG. 2 is an example architecture of an avatar video pipeline, according to some embodiments.

FIG. 2 is an example architecture of an avatar video pipeline 200, according to some embodiments. The avatar video pipeline 200 can be implemented on a computer system, including the server device 102 of FIG. 1. As depicted in FIG. 2, beginning with the item identifier 202, the arrows depict a general flow of data through the pipeline as the computer system performs operations to generate the video (e.g., video 226). However, additional information may be input at various places within the avatar video pipeline 200 that are not depicted in FIG. 2. For example, in some embodiments, the computer system may use the item identifier 202 to identify related items for the item (e.g., items from the same manufacturer), which can be used by any of the machine learning models in the avatar video pipeline 200 to generate the corresponding output.

As described briefly above, the computer system implementing the avatar video pipeline 200 can maintain item information 204 for a variety of items that can be the subject of the video 226. The item information 204 can include images of the item corresponding to the item identifier 202 as well as text description, user reviews, technical information and instructions for the item, manufacturer information, and an item type or item category. The item information 204 can be input into a scripting model 206 to generate a script 208. The script 208 may be an example of script 108 described above with respect to FIG. 1. In some embodiments, the scripting model 206 may be similar to implementations of a system for generating scripts for audio advertisements described in related U.S. patent application Ser. No. 18/186,530, filed on Mar. 20, 2023, and titled "AUTOMATED GENERATION OF AUDIO SEGMENTS FROM ITEM DATA," the entire contents of which are hereby incorporated by reference in their entirety for all purposes.

As a particular example, the item information 204 can correspond to information about a product offered on a webpage of an online retailer. The item information 204 can include the title of the product, which can include both the product name and any associated brand. The title of the product may be used by the online retailer to provide effective search visibility, and may be useful to users of the online retailer for recognition of the product and the product brand(s). The item information 204 can also include visual representations of the product from different angles, which can provide users of the online retailer a clear idea of what the product looks like.

The scripting model 206 can incorporate the different views of the product into the script 208, so that representations of the product in the video 226 can include views of the product that are similar to those included in the item information 204. The item information 204 can also include a list of key product features and/or benefits (e.g., in bullet form), a more detailed narrative about the product, its uses, and any additional information that might be relevant to a user viewing the product webpage, and options such as size, flavor, pack size, or color that are available for the product, customer reviews and other feedback from customers who have purchased the product, which can help inform the purchasing decisions for the product. The item information 204 can also include customer questions and answers: a section where potential buyers can ask questions about the product and receive answers from other customers and/or the product seller. The item information 204 can also include a unique identifier (e.g., item identifier 202) for the product within a product catalog stored in a database, like an ASIN (Amazon Standard Identification Number). The unique identifier may be included in a uniform resource locator (URL) for the product webpage.

The above examples of item information 204 for a product webpage at an online retailer can be presented in the webpage using various technologies to compose and format the webpage. For example, hyper-text markup language (HTML) may be used to characterize the basic structure of the product webpage based on the URL containing the item identifier, while cascading style sheets (CSS) can be used to apply a style and layout in which images of the product (e.g., views from different angles) are displayed next to the key product features (e.g., bulleted list), with the product title and branding prominently displayed. Scripting technology (e.g., JavaScript) can provide dynamic elements to the web page (e.g., in-window video players showing videos related to the product) and client-side scripting. As this particular example relates to embodiments of the present disclosure, the video 226 generated by the avatar video pipeline 200 can be incorporated into the product webpage along with the item information 204. For example, the video 226 may be displayed on the product webpage next to the bulleted list of key product details, providing a user with additional contextual information about the product presented by a realistic avatar in which the product information can be efficiently and effectively conveyed in an engaging video format.

The scripting model 206 can be an LLM trained to generate the script 208 from input item information 204. The scripting model 206 can be trained to understand the context of the video content. For example, the scripting model 206 may be trained to generate advertisement context for an item, so that the script 208 relates to advertising the item. In some embodiments, the scripting model 206 may be trained to generate educational context from item information for use in videos providing educational information on a subject. The script 208 output from the scripting model 206 can include both the text for the voiceover spoken by the avatar (e.g., avatar 218) and a description of each scene in the video 226. For example, the script 208 can include a storyboard 209 that describes the number of different scenes in the video 226 and describes the camera effects and pose for each scene. The storyboard 209 can include information describing the content of each scene, the ordering of the scenes in the video 226, the camera effects for each scene, and/or the additional assets (e.g., assets 115 of FIG. 1) that can be incorporated into the video 226.

The avatar video pipeline 200 can also include a TTS engine 210. The TTS engine 210 can be configured to produce audio 212 from a portion of the script 208. For example, the TTS engine 210 can generate audio 212 that corresponds to the voiceover to be spoken by the avatar 218. The TTS engine 210 can generate the audio 212 to be in various languages and/or have various accents, pitches, tones, or other voice qualities. In some embodiments, the TTS engine 210 can generate the audio 212 based on context determined from the script 208. For example, if the script 208 includes voiceover text with words spelled according to a particular accent (e.g., words with British English spellings), the TTS engine 210 can generate the audio 212 to have a British English accent.

The avatar video pipeline 200 can also include an avatar generation system 214. The avatar generation system 214 can be configured to take the audio 212, script 208, and/or avatar properties 216 as inputs to generate an avatar 218. In some embodiments, the avatar generation system 214 can include one or more machine learning models, including a diffusion model, to generate the avatar 218 with an appearance characterized by the avatar properties 216 and with accurate facial animations that correspond to the voiceover text in the script 208. In some embodiments, the avatar generation system 214 can include a diffusion model that can be configured to perform diffusion in a texture space for the avatars so that the output textures are sampled and applied to an accurately rendered model of the avatar face. Specific details of such an avatar generation can be found in U.S. patent application Ser. No. 18/615,662.

In some embodiments, the avatar generation system 214 can retrieve an avatar from a repository. For example, previously generated avatars from other videos generated by the avatar generation system 214 can be stored by the computer system implementing the avatar video pipeline 200. Based on the avatar properties 216 and the script 208, the avatar generation system 214 can determine a corresponding stored avatar and retrieve it. The retrieved avatar can then be animated so that the facial movements accurately correspond to the speech of the audio 212.

The avatar properties 216 can include specifications describing an avatar appearance. In some embodiments, the avatar properties 216 are provided to the avatar video pipeline 200 from a user device (e.g., user device 104 of FIG. 1) based on user input. For example, a user may be presented with one or more avatar templates that depict various avatar appearances (e.g., a still image of an example avatar). These avatar templates may correspond to previously generated avatars that may be reusable by the avatar generation system 214 when generating the avatar 218. In some embodiments, the avatar generation system 214 can use the script 208 to determine a selection of avatar templates to present at the user device based on the context in the script. For example, if the script 208 has a description of a kitchen appliance, the avatar templates can include avatars wearing a kitchen apron and other avatars not wearing a kitchen apron, so that the user can choose whether such a garment would enhance the video 226. In some embodiments, the avatar properties 216 can be included in a prompt (e.g., a text prompt) that a user provides to describe the desired appearance of the avatar 218. In some embodiments, the avatar properties 216 can include user inputs from sliders that adjust parameters for the face shape or face appearance of the avatar.

The avatar generation system 214 can also determine one or more gestures to be performed by the avatar 218. The gestures can be determined based on the script 208. For example, words in the voiceover text that identify the item by name can indicate that the avatar 218 should gesture to the item in the video 226 when those words are spoken. As another example, the script 208 can include words that are typically associate with particular gestures and generate those gestures for the avatar 218 to perform when those words are spoken. For instance, if the script 208 includes a number (e.g., "three"), the avatar generation system 214 can generate a gesture of the avatar holding up three fingers when that word is spoken. Additional details about generating gestures for the avatar 218 are provided below in FIG. 3.

The avatar video pipeline 200 can also include a scene model 220. The scene model 220 can be configured to take the avatar 218 and script 208 as inputs and generate a background scene 222 in which the avatar has been positioned for each frame of the video 226. The scene model 220 can include a diffusion model trained to generate the background scene 222 based on text from the script 208. For example, the script 208 can be for a kitchen appliance advertisement. Based on the context of an appliance for use in a kitchen, which can be specified in the description portion of the script 208, the scene model 220 can use the diffusion model to generate a realistic kitchen, including countertops, cabinetry, a sink, and other elements that would be present in a kitchen. Other examples of context aware scene generation include the scene model 220 identifying a season (e.g., a holiday season, a season of the year, etc.) and generating the scene to match the season (e.g., a Christmas background scene, an outdoor scene in winter, etc.). The scene model 220 can position the avatar 218 within the generated background scene 222. Using the kitchen example above, the scene model 220 can position the avatar 218 behind a countertop in the foreground of the kitchen, so that the avatar 218 appears to be "within" the scene rather than merely overlaid on top of the background. The scene model 220 can also produce lighting and shadow effects for the avatar 218 within the background scene 222. For example, the avatar 218 can project a realistic shadow in the background scene 222 that appears to be cast on the floor, walls, or other objects in the background scene 222. Examples of particular background scenes are described below with respect to FIGS. 7-11.

The avatar video pipeline 200 can also include a video composer 224. The video composer 224 can be configured to construct the video 226 using the avatar 218 and the background scene 222. While the scene model 220 may embed the avatar 218 within the background scene 222, so that the avatar's 218 positioning and movement are realistic with respect to both the audio 212 and the item being demonstrated, the video composer 224 can add or modify effects related to scene transitions, arrangement of supporting assets (e.g., different images of the item, images of the item in use, etc.), the positioning of the virtual camera (e.g., the view presented in the video), the field of view and panning and zooming of the virtual camera, sound effects and other audio, and text overlaid on the video 226. The video composer 224 can determine background music suitable for the video 226, as well as sound effects to insert into the video 226 at appropriate times. For example, the video composer 224 can determine that the avatar is pouring coffee from a coffee pot as part of demonstrating a coffee maker appliance. The video composer 224 can add sounds effects of the pouring coffee and the placing of the coffee pot and/or a mug onto the counter shown in the background scene 222. The video composer 224 can retrieve additional assets from storage within the computer system implementing the avatar video pipeline 200. For example, the item information 204 can include additional images or video footage of the item that can be incorporated into the video 226.

In some embodiments, the avatar video pipeline 200 can be configured to identify use context of the item from the item information 204 to use when generating the avatar 218, the background scene 222, and the video 226. For example, the item information 204 can include images of people using the item in particular manner. For instance, for a coffee maker kitchen appliance, the item information 204 can include images of a user making a pot of coffee with the coffee maker and pouring a cup of coffee from the coffee carafe. In addition to generating the avatar 218 to make suitable gestures when speaking the voiceover text of the script 208, the avatar generation system 214 can also determine, using the additional images of the use of the item, gestures that correspond to that use of the item. The avatar 218 can then have a gesture animated to interact with the item in the video 226 (e.g., pressing function buttons to brew coffee, pouring coffee, holding a cup, etc.) that are determined from use context of the item information 204.

Figure 3:
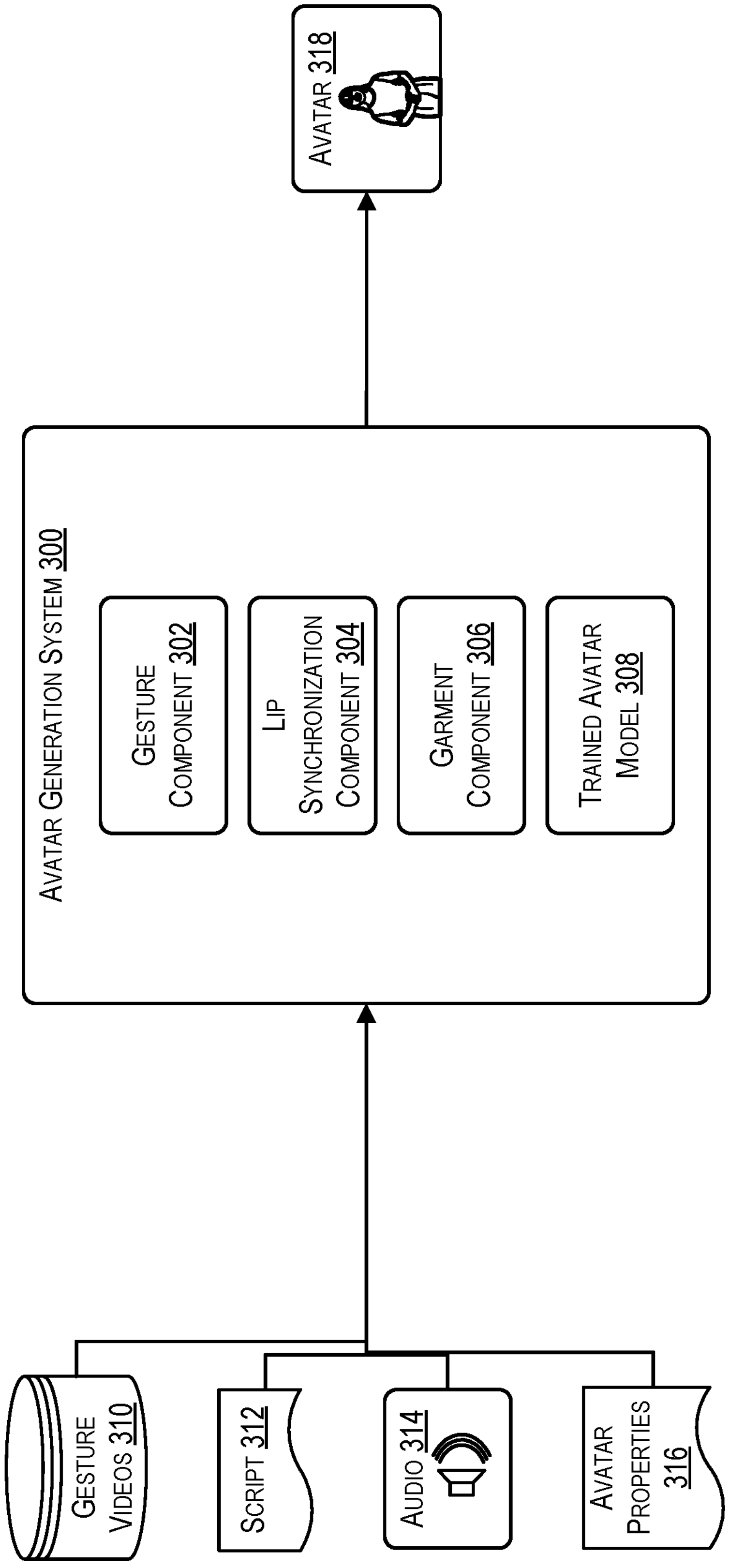
FIG. 3 is an example architecture of an avatar generation system, according to some embodiments.

FIG. 3 is an example architecture of an avatar generation system 300, according to some embodiments. The avatar generation system 300 may be an example of avatar generation system 214 described above with respect to FIG. 2. The avatar generation system 300 can include a gesture component 302, a lip synchronization component 304, a garment component 306, and, in some embodiments, a trained avatar model 308. The avatar generation system 300 can take as inputs gesture videos 310, a script 312, audio 314, and avatar properties 316, and output an avatar 318. The avatar 318 may be an example of the avatar 218 described above with respect to FIG. 2.

In some embodiments, the avatar generation system 300 can select a previously generated avatar to use as avatar 318. Selecting this avatar may be done based on information in the script 312 and the avatar properties 316. For example, the script 312 can indicate that the item to be demonstrated in the video is a kitchen appliance and the avatar properties 316 can indicate that the avatar 318 should be a male wearing a kitchen apron while narrating via the audio 314 and performing suitable gestures. The avatar generation system 300 can select a previously generated avatar that corresponds to the desired avatar properties 316. In these embodiments, the previously generated avatar can be animated to perform the new gestures as well as speak the words in the script accurately in accordance with audio.

In some embodiments, the avatar generation system 300 can generate a new avatar using the script 312 and avatar properties 316. When generating a new avatar, the avatar generation system 300 can use a trained avatar model 308 in which the avatar's facial animations are modeled in accordance with the audio 314. Such a trained avatar model can be configured to take as inputs a text prompt, face shape parameters, and a face expression sequence generated based on the audio 314. The face shape parameters can include additional user input defining the shape of the avatar face, including, for example, parameters for face width, position of facial features, and the like. The face shape parameters may be provided by a user via a GUI of a user device.

Figure 9:
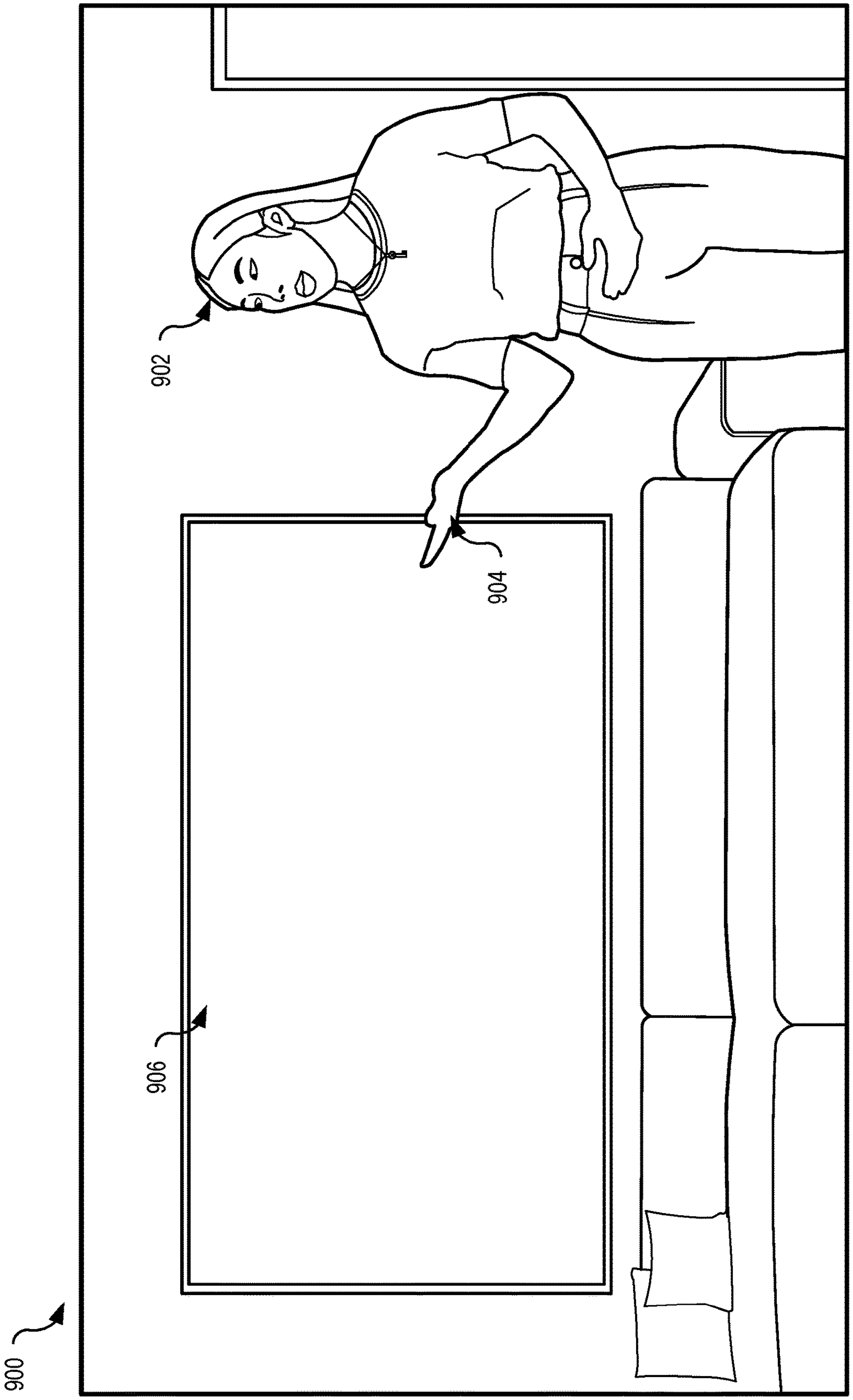
FIG. 9 illustrates another gesture of an avatar, according to some embodiments.
Figure 10:
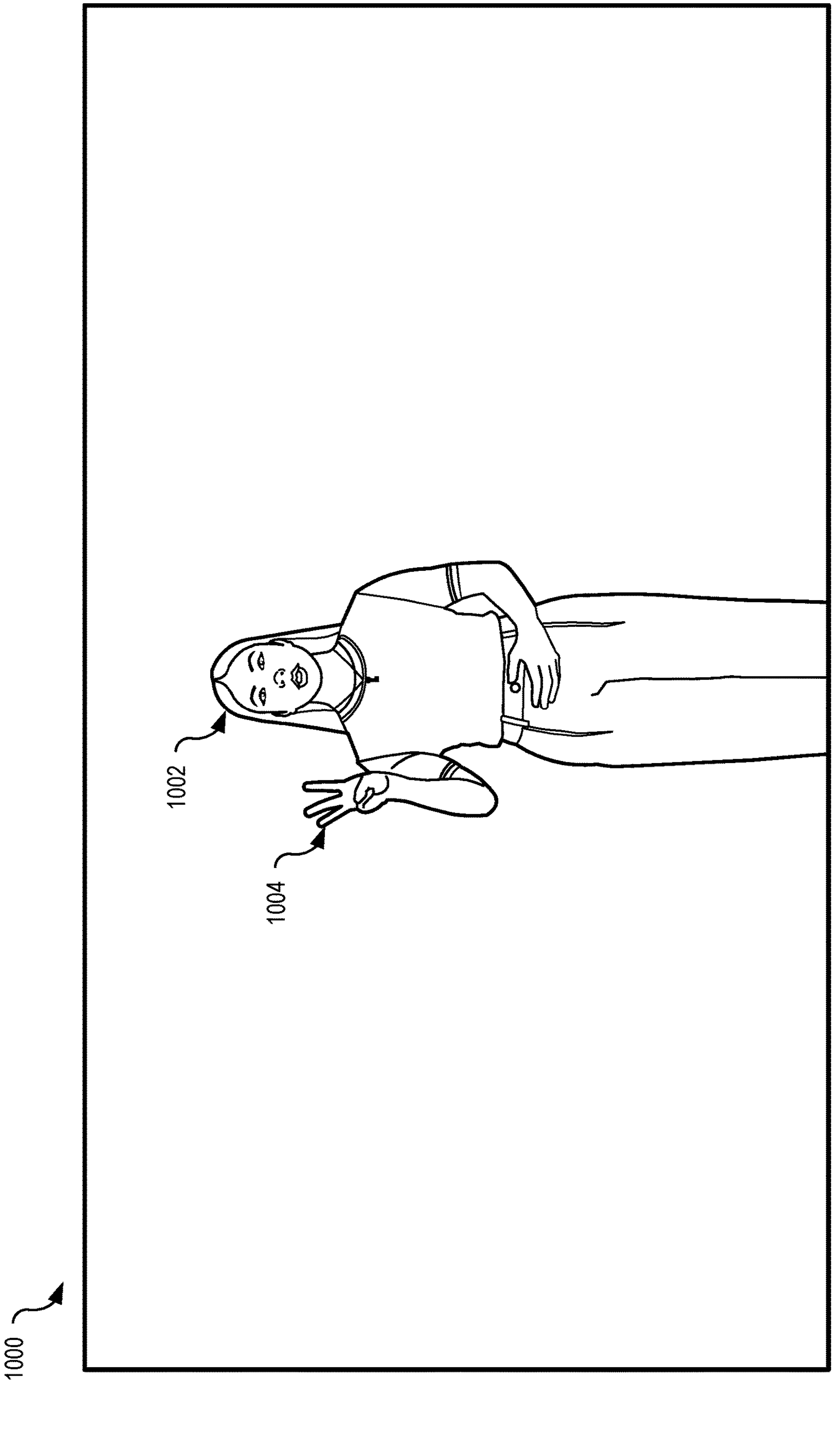
FIG. 10 illustrates an avatar placed within a scene generated using information associated with an item, according to some embodiments.

The gesture component 302 may be configured to determine one or more suitable gestures for the avatar 318 to perform within a video. Non-limiting examples of various gestures that an avatar can perform include pointing with a hand, a palm-up display motion with a hand, emphatic motions with the hands in front of the avatar body, holding up digits of a hand to indicate a number, clasping hands in front of the avatar body, and the like. To determine a gesture, the gesture component 302 can use the script 312 to identify words (e.g., using a predictive model) that are likely to correspond to particular gestures. For example, if the script 312 includes the name of the item specified by an item identifier, the gesture component 302 can determine that the avatar 318 should point to the item within the video when the name of the item is spoken in the audio 314 by the avatar 318. Such a gesture is depicted in FIG. 9. As another example, if the script 312 includes a spoken number (e.g., "three"), the gesture component 302 can determine that the avatar 318 should hold up three fingers on one hand to emphasize the spoken number. Such a gesture is depicted in FIG. 10.

More generally, a predictive model of the gesture component 302 can be trained using training videos of people speaking text that is similar to the text of the script 312 and including corresponding natural gestures. When so trained, the predictive model can determine from the context of the script 312 the type of gesture that is most likely to occur with particular words in the script in a natural and realistic manner. To determine how the avatar 318 should be animated with the one or more gestures, the gesture component 302 can obtain gesture videos 310, which can depict people speaking and performing gestures. Based on the determined gestures, the gesture component 302 can identify a corresponding gesture in a gesture video 310 to use to animate avatar 318.

The lip synchronization component 304 can be configured to animate the face and mouth of the avatar 318 to match the audio 314. Animating the avatar can include lip-synching the avatar to the audio 314.

Figure 11:
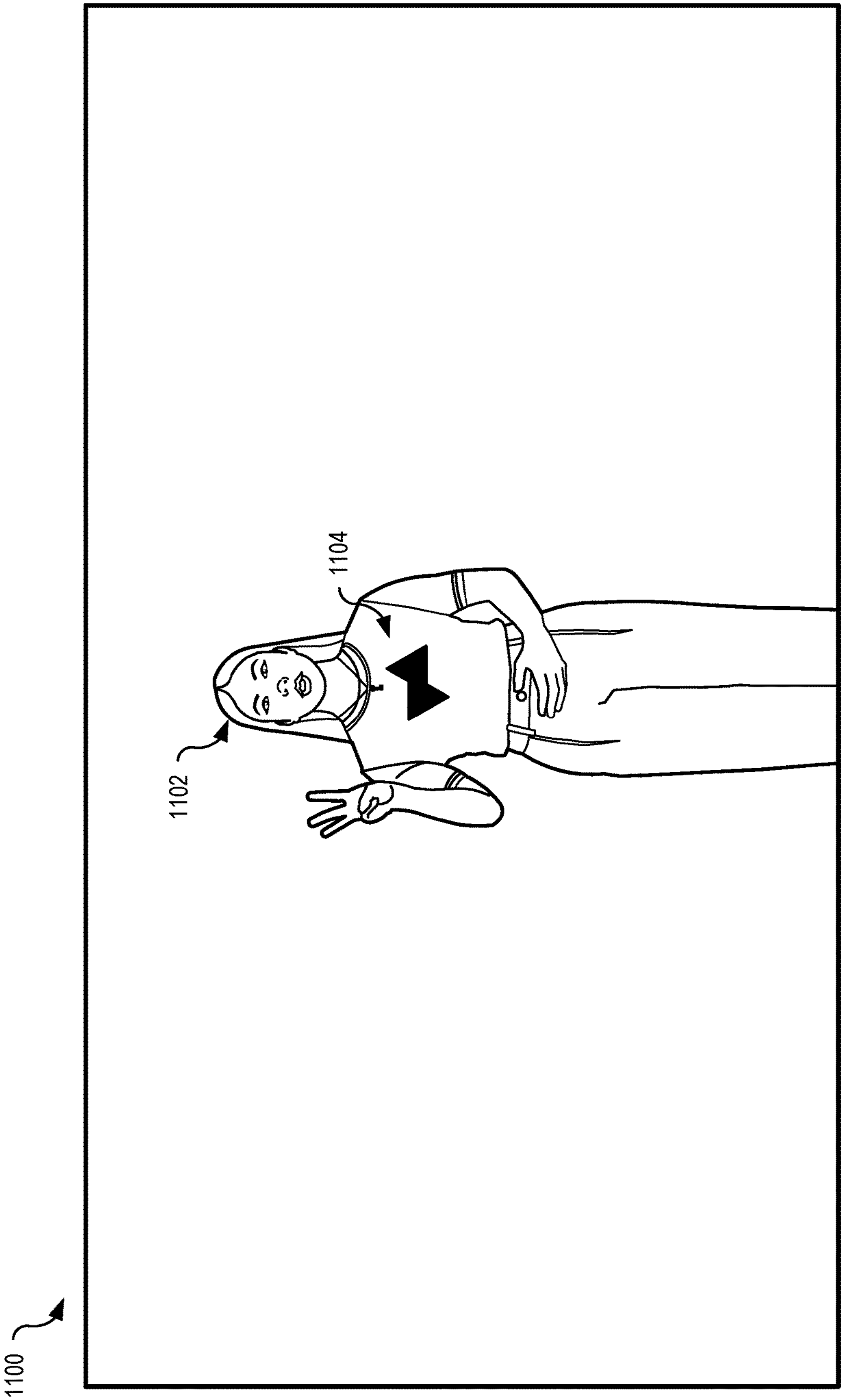
FIG. 11 illustrates an avatar having customized garments, according to some embodiments.

The garment component 306 can be configured to determine suitable clothing for the avatar 318. Determining garments for the avatar 318 can include specifying the colors and styles shown worn by the avatar 318. In some embodiments, the garment component 306 can determine from the script 312 that the item to be demonstrated is an article of clothing. The garment component 306 can then generate the avatar 318 wearing the particular article of clothing so that the video demonstrates the item as it would be in use with a person. For example, the item can be a t-shirt from a particular manufacturer and bearing the manufacturer's logo prominently. The garment component 306 can generate the avatar 318 wearing the t-shirt and displaying the logo as part of the video. In this example, the gesture component 302 can also determine that a suitable gesture for the avatar 318 would be a hand gesture emphasizing the article of clothing and highlighting the logo. In addition, the garment component 306 can determine garment accessories such as, for example, glasses, earrings, piercings, necklaces, watches, bracelets, rings, belts, suspenders, hair ties, neckties, hats, coverings, jewelry, and the like. As with the garments described above, the garment component 306 can determine the garment accessories based on a brand associated with the item demonstrated by the avatar 318 in the video. An example of an avatar with particular garments is shown in FIG. 11.

In some embodiments, the avatar generation system 300 can add additional facial animations, like head nods, head turns, eye blinks, smiles and other emotive expressions to an avatar 318. Such expressions may be distinguished from the one or more gestures performed by the avatar 318. These expressions can be determined based on the script 312 and audio 314 in a manner similar to the one or more gestures in order to match corresponding words spoken by the avatar 318 with a suitable expression. For example, the script 312 may indicate that a new feature of kitchen appliance will save significant time when preparing a meal, so that the corresponding description is spoken excitedly. The avatar's 318 face and head can then be animated with an excited smile and a raising of the eyebrows to indicate this expression. Many other similar expressions are contemplated.

Figure 4:
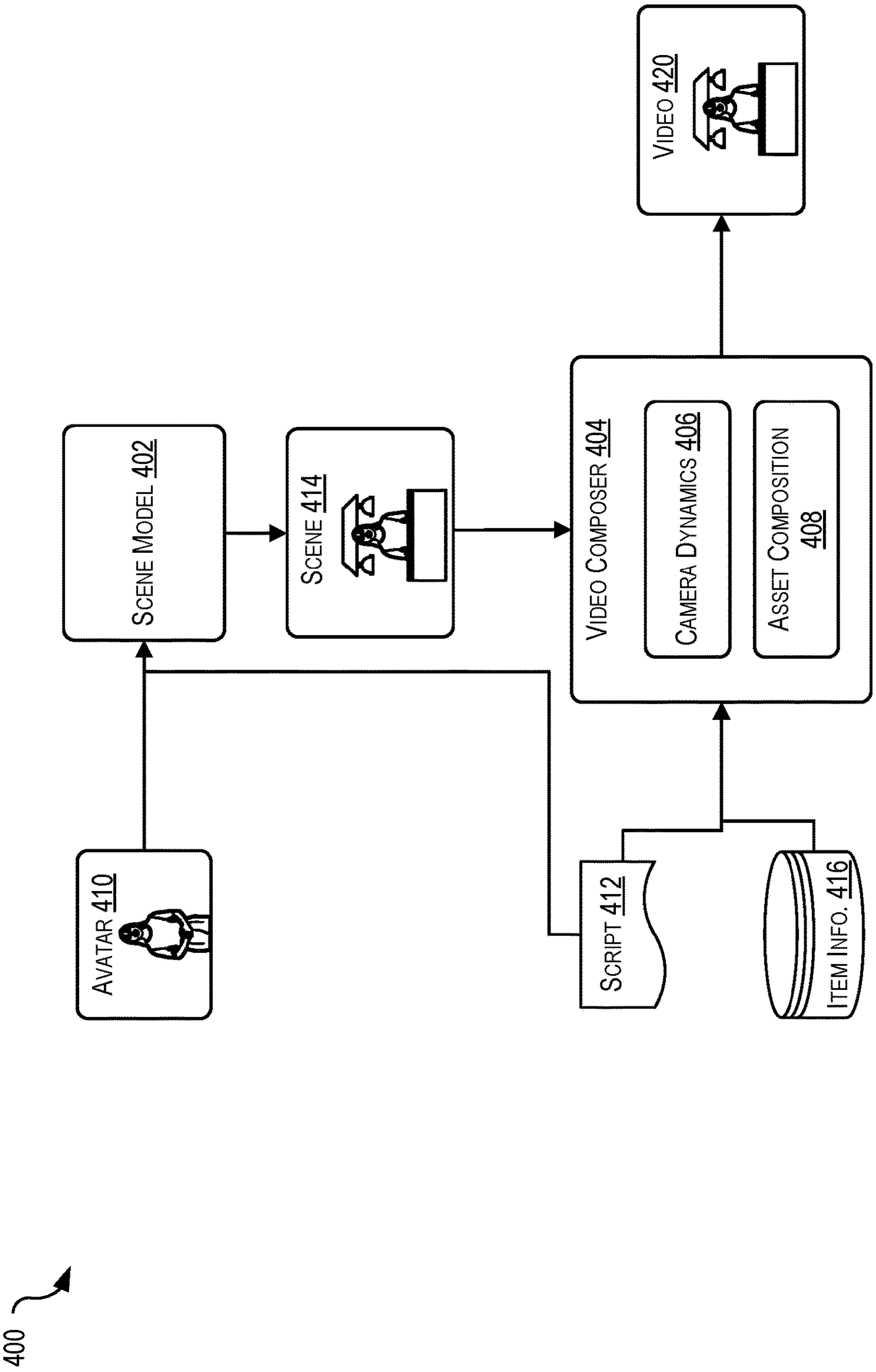
FIG. 4 is an example architecture of a scene model and video composer, according to some embodiments.

FIG. 4 is an example architecture of a scene model 402 and video composer 404 within a portion of an avatar video pipeline 400, according to some embodiments. The scene model 402 and the video composer 404 may be examples of scene model 220 and video composer 224 of FIG. 2, respectively. The scene model 402 can take as input an avatar 410, a script 412, and, in some embodiments, item information 416 to generate a background scene 414. The background scene can be contextually related to the item information. The video composer 404 can take as input the background scene 414, the script 412, and the item information 416 to generate the video 420. The avatar 410, script 412, background scene 414, item information 416, and video 420 may be examples of avatar 218, script 208, background scene 222, and video 226 of FIG. 2, respectively.

The scene model 402 can include one or more machine learning models (e.g., a diffusion model, which in turn can include one or more neural networks or related architectures) that can be trained to generate a background scene 414 based on the script 412. In some embodiments, the scene model 402 can include a diffusion model that is trained to render a background scene based on context determined from the script 412. For example, the script 412 may be for an advertisement of kitchen appliance as identified by keywords within the script 412 or contextual information like the item being used for food preparation. The scene model 402 can then generate a background scene 414 of a kitchen, with countertops, cabinets, and other kitchen appliances like a sink, a range, and the like. The background scene 414 may depict a static view of the scene for the entire video. In some examples, the scene model 402 can generate multiple view of the same background scene 414 for use in conjunction with the video composer 404. Using the kitchen example above, the scene model 402 can generate multiple background scenes that include a shot of the kitchen from the front that is normal to the countertops and cabinetry, a shot from an elevated angle down toward the countertops, and another shot from the side of the kitchen providing a third view of the scene. In some examples, the background scene 414 can be rendered in three dimensions so that visual information for the scene from different views (e.g., different virtual camera poses) is included in the background scene 414.

Figure 7:
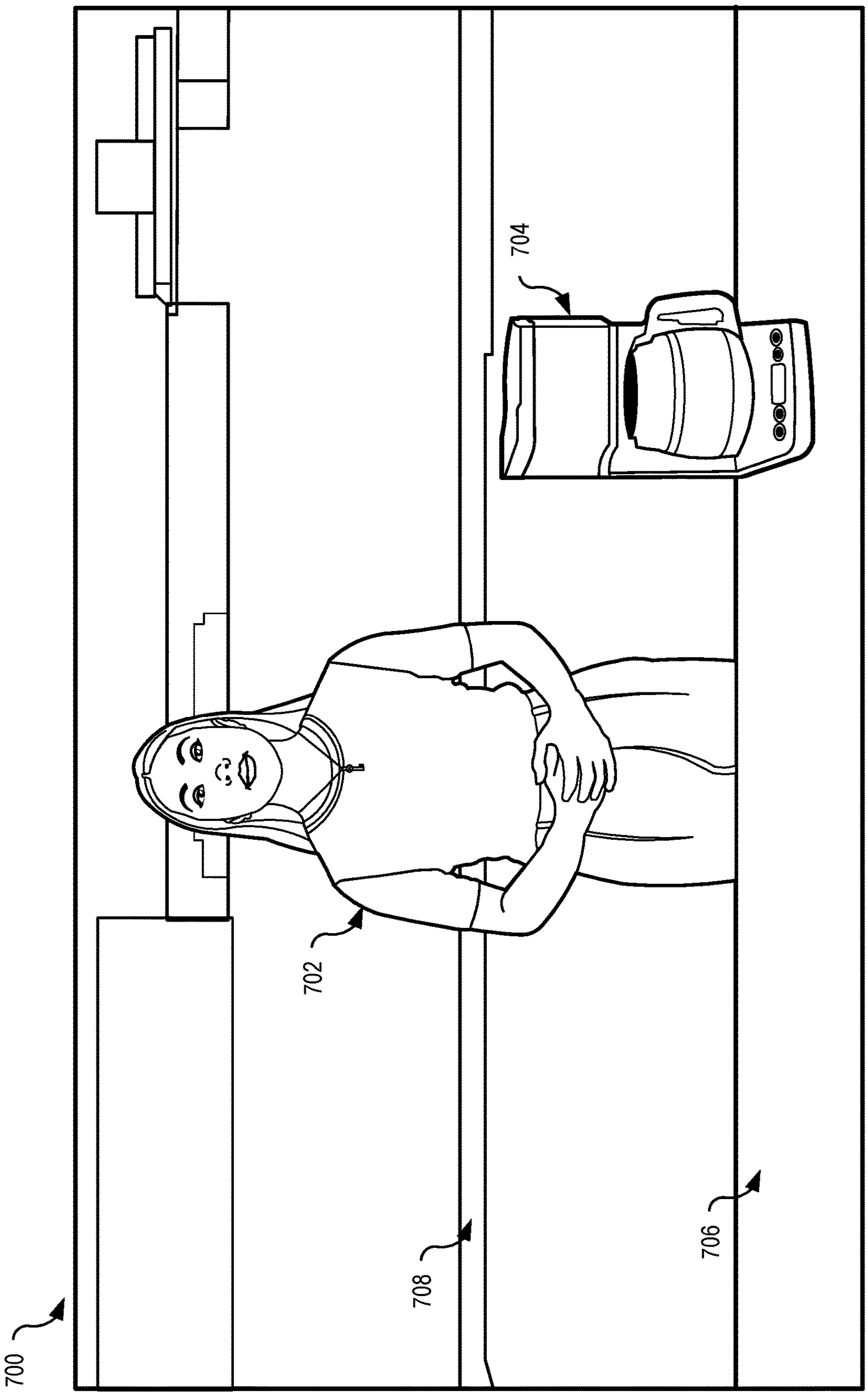
FIG. 7 illustrates an avatar placed within a scene, according to some embodiments.

The scene model 402 can also be configured to position the avatar 410 within the background scene 414. To create realistic and visually appealing videos that do not distract from a viewer receiving the content therein, the scene model 402 can "embed" the avatar 410 within the background scene 414 by positioning the avatar 410 at least partially behind a foreground element but in front of a background element of the background scene 414. For example, in the kitchen background example above, the scene model 402 can position the avatar 410 behind a foreground countertop but in front of a second background countertop, so that the avatar 410 appears to be standing in the kitchen when performing gestures and speaking the script for the video. An example of such positioning is shown in FIG. 7.

The video composer 404 can be configured to construct the video 420 from the background scene 414 and additional assets determined from the script 412 and the item information 416. The video composer 404 can include a camera dynamics component 406 and an asset composition component 408. The camera dynamics component 406 can be configured to determine the field of view and pose of the virtual camera that is viewing the background scene 414 in the video 420. For example, the camera dynamics component 406 can determine that the video 420 should begin with a wide shot (e.g., a wide field of view) of the background scene 414 including the avatar 410 narrating an introduction to the item according to the script 412. Then, the camera dynamics component 406 can zoom in closer on the avatar as the video progresses, before adding a transition to a cutaway shot of a related video of the item determined by the asset composition component 408 (described below). The camera dynamics component 406 can then include an angled shot of the item in the kitchen with the avatar 410 as the video 420 concludes.

The asset composition component 408 can be configured to use the script 412 and item information 416 to determine and retrieve additional assets for use in the video 420. For example, an item offered for sale by an online service provider may have an associated short video clip of the item in operation. This asset may be maintained as part of the item information 416 or separately by the service provider. The asset composition component 408 can obtain the video clip and include it as part of a scene in the video 420. For example, the video 420 can begin with a narration by the avatar 410 according to the script 412, then cut away to the video clip of the item in operation, then cut back to a view of the avatar 410 in the scene continuing the narration.

Figure 5:
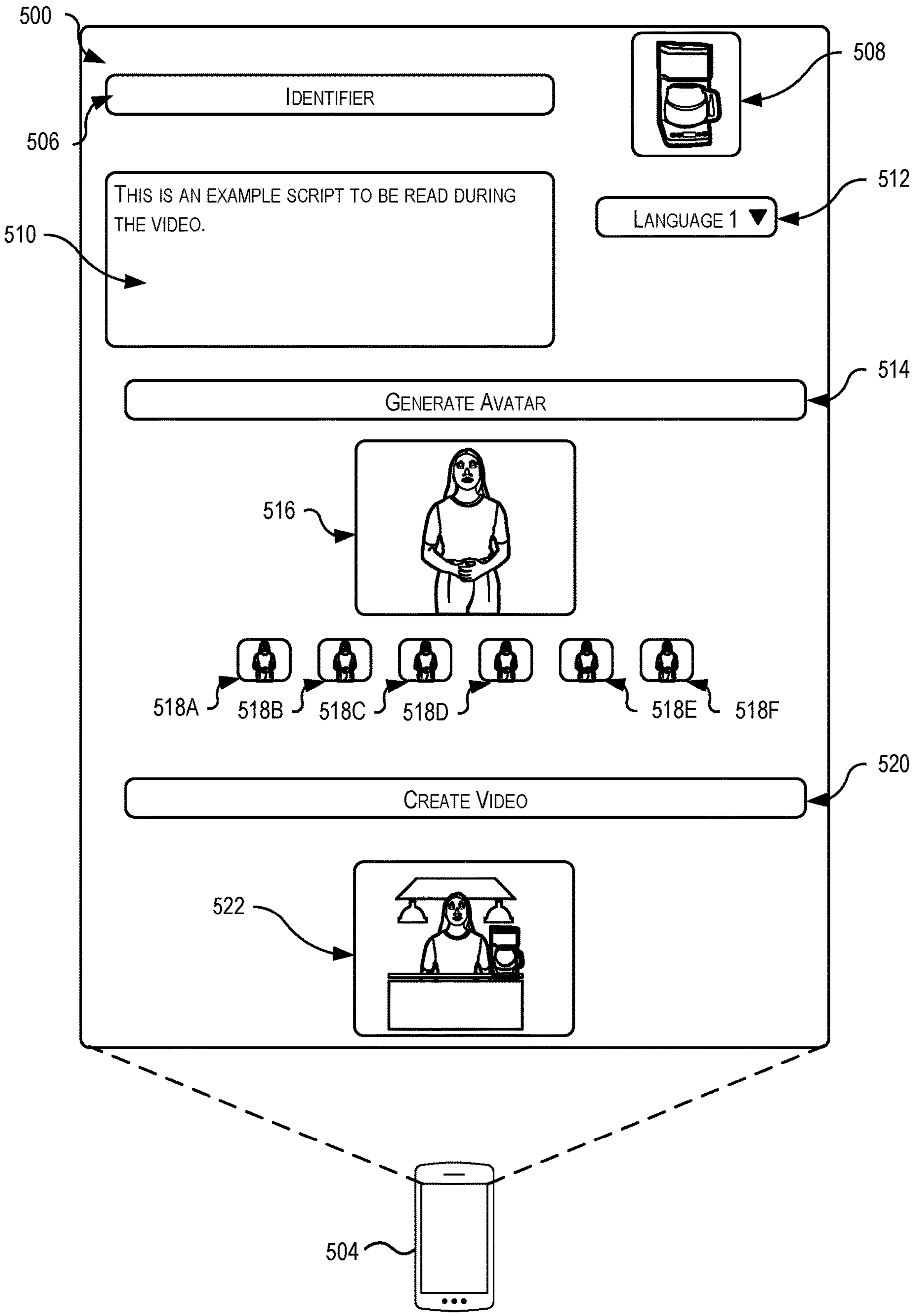
FIG. 5 illustrates a graphical user interface of a user device for obtaining user inputs for an avatar video pipeline, according to some embodiments.

FIG. 5 illustrates a graphical user interface (GUI) 500 of a user device 504 for obtaining user inputs for an avatar video pipeline, according to some embodiments. The user device 504 may be an example of user device 104 of FIG. 1, and can be communicatively connected to a computer system implementing the avatar video pipeline (e.g., server device 102 of FIG. 1).

As depicted in FIG. 5, the GUI 500 can be presented at a display of the user device 504. The GUI 500 can include one or more fields for accepting user input to provide and/or modify aspects of the avatar video pipeline. The one or more fields can include an identifier field 506 to input an item identifier (e.g., item identifier 202 of FIG. 2). The user device 504 can send the input item identifier to the computer system implementing the avatar video pipeline. Components of the avatar video pipeline can generate a script that is sent to the user device 504 and displayed in a text field 510. In addition, the GUI 500 can display an image 508 of the item corresponding to the item identifier input in the identifier field 506.

In the text field 510, the user can make modifications, additions, or deletions to the script that was generated by the avatar video pipeline to produce a modified script. For example, the user can add additional descriptive language to the script. The GUI 500 can also include a language selector 512 that the user can interact with to set a different language for the script. For example, the user device 504 can implement a translation application (or access an online translation service) to translate the script from a first language to a second language.

The GUI 500 can also include a generate avatar button 514 that can indicate to the avatar video pipeline that the script is complete and that a corresponding avatar should be generated. The GUI 500 can present an image of the avatar 516. In some examples, before the avatar is generated, the GUI can present at the GUI a selection of avatar templates 518A-F that exhibit various avatar properties that can be selected by the user. The avatar templates can include, for example, depictions of previously generated avatars that have different appearances (e.g., hair color or style, appearance). The user can select one of the avatar templates (e.g., avatar template 518A) and the corresponding avatar property can be sent to the avatar video pipeline to generate the avatar. Each of avatar templates 518A-F may exhibit one or more avatar properties that are different. For example, avatar template 518A may correspond to an avatar having a particular appearance in a full body shot, while avatar template 518B is the same avatar as avatar template 518A but in an upper body shot, while avatar template 518C is the same avatar as both 518A and 518B but having a different hairstyle and in a full body shot. Although not shown in FIG. 5, the GUI 500 can include other elements like sliders to adjust avatar properties for the desired avatar.

The GUI 500 can also include a create video button 520. Once the user is satisfied with the appearance of the avatar (as depicted in the image of the avatar 516), the user can select the create video button 520. The user device an send an indication to the computer system implementing the avatar video pipeline to complete the video process by generating a background scene and composing the video. Once the video is completed, the user device can receive the video and display it as a video element 522 for the user's review.

Although the GUI 500 depicted in FIG. 5 shows an interface in which a user can make selections and/or modify or input text and other information, other embodiments of a user interface are contemplated. For example, a user can engage in a conversational interaction with an interface of the user device 504 to step through the process of generating the video. The conversational interaction could be written (e.g., a chatbot application presented at the user device 504) or could be spoken (e.g., a spoken conversation with a voice assistant of the user device 504, via microphone and speaker). The interaction could have the user identify a product by name and indicate that the user desires an avatar video created for that item. In response, the user device could present the indicated item and item identifier and a proposed script. The user could then make modifications directly, or ask that particular changes be made by the avatar pipeline. The back and forth conversational inputs and outputs between the user and the avatar generation pipeline via the user device 504 can continue for each portion of the video generation process, including selecting avatars and/or avatar properties, changing the script language, and identifying additional items to use when creating the final video.

Figure 6:
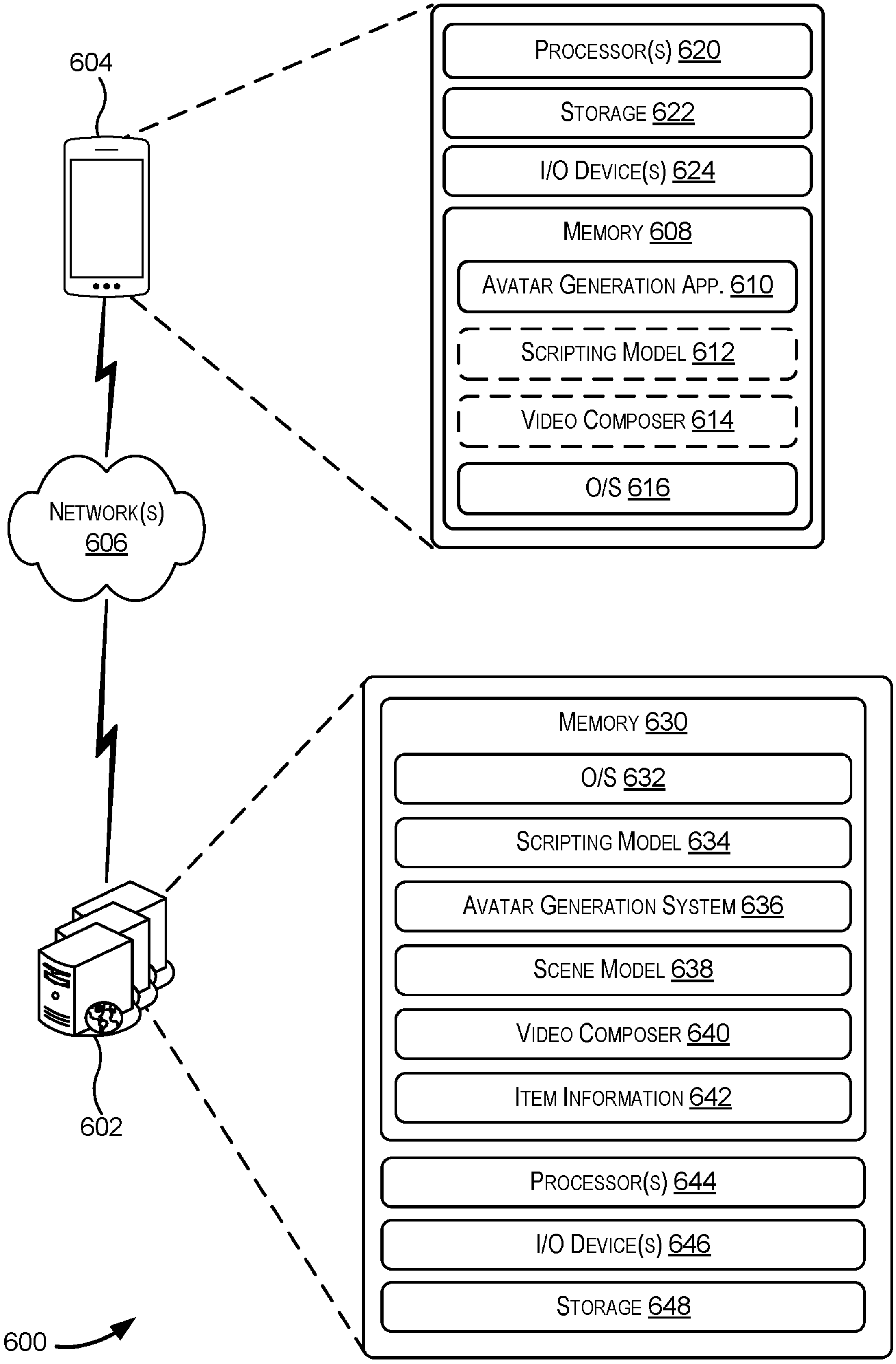
FIG. 6 is an example architecture of a computing system in which embodiments of the present disclosure can be implemented.

FIG. 6 is an example architecture of a computing system 600 including a plurality of components that may perform function in accordance with at least one embodiment of the present disclosure. The computing system 600 includes a server device 602, (e.g., server device 102 of FIG. 1), a user device 604 (e.g., user device 104 of FIG. 1), and one or more network(s) 606. The server device 602 can be a server device or one or more remote computing devices, including cloud devices, and may host components of an avatar video pipeline including a scripting model 634, avatar generation system 636, scene model 638, and video composer 640. The server device 602 can also maintain item information 642 in memory 630 or storage 648. These components may be examples of other similarly named components described herein, including scripting model 206, avatar generation system 214, scene model 220, and video composer 224 of FIG. 2. The network(s) 606 may include any one or a combination of many different types of networks, such as cable networks, the Internet, wireless networks, cellular networks, and other private and/or public networks.

As described herein, the user device 604 can have at least one memory 608, one or more processing units (or processor (s)) 620, and one or more input/output ("I/O") device(s) 624. The processor(s) 620 may be implemented as appropriate in hardware, computer-executable instructions, firmware, or combinations thereof. Computer-executable instruction or firmware implementations of the processor(s) 620 may include computer-executable or machine executable instructions written in any suitable programming language to perform the various functions described. The I/O device(s) 624 can include displays, monitors, touch screens, mouse, keyboard, microphones or other audio input components, speakers, or other I/O device.

The memory 608 may store program instructions that are loadable and executable on the processor(s) 620, as well as data generated during the execution of these programs, login information, account information, interaction information, and the like. Depending on the configuration and type of user device 604, the memory 608 may be volatile (such as random access memory ("RAM")) or non-volatile (such as read-only memory ("ROM"), flash memory, etc.). In some implementations, the memory 608 may include multiple different types of memory, such as static random access memory ("SRAM"), dynamic random access memory ("DRAM") or ROM. The user device 604 may also include additional storage 622, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 622 may be utilized to store data contents received from one or more other devices (e.g., server device 602). For example, the storage 622 may store avatar templates, scripts, and item information generated by the server device 602 and/or sent to the user device 604 to display content from a service provider to be displayed at a GUI (e.g., GUI 500 of FIG. 5) for presentation in an interactive session with a user.

The memory 608 may include an operating system (O/S) 616 and one or more application programs, modules, or services for implementing the features disclosed herein, including an avatar generation application 610. The avatar generation application 610 may be configured to present the GUI for the interactive avatar creation session at the user device 604 and to interface with one or more components of a computer system implementing an avatar video pipeline (e.g., server device 602) to send avatar properties and item identifiers. The avatar generation application 610 may, in some embodiments, be an application associated with the avatar video pipeline (e.g., configured to receive content from the server device 602, including avatar templates, scripts, and avatar videos. The GUI of the avatar generation application 610 may be presented at one of the I/O device(s) 624 (e.g., a display). The avatar generation application 610 may receive user input to generate and/or modify a script, initiate the avatar generation process, and initiate the avatar video generation process.

Turning now to server device 602 in more detail, the server device 602 can be any suitable type of computing device including, but not limited to, a laptop computer, a desktop computer, a mobile phone, a smartphone, a server computer, etc. In some embodiments, the server device 602 is executed by one or more virtual machines implemented within a cloud computing or other hosted environment. The cloud computing environment may include provisioned computing resources like computing, storage, and networking. The server device 602 can communicate with the user device 604 via the network(s) 606 or other network connections. The server device 602 may be configured to implement the functionality described herein as part of a distributed computing environment.

The server device 602 can include a memory 630, one or more processor(s) 644, I/O devices 646, and at least one storage unit 648. As with the processor(s) 620 of user device 604, the processor(s) 644 may be implemented as appropriate in hardware, computer-executable instructions, software, firmware, or combinations thereof. Computer-executable instruction, software, or firmware implementations of the processor(s) 644 may include computer-executable or machine-executable instructions written in any suitable programming language to perform the various functions described. The memory 630 may store program instructions that are loadable and executable on the processor(s) 644, as well as data generated during the execution of these programs. Depending on the configuration and type of memory included in the server device 602, the memory 630 may be volatile (such as RAM) and/or non-volatile (such as read-only memory ("ROM"), flash memory, or other memory). In some embodiments, the storage 648 may include one or more databases, data structures, data stores, or the like for storing and/or retaining information associated with the server device 602 or the user device 604. The storage 648 may include item information 642, previously generated avatars, gesture videos, additional video assets for items, and the like.

The memory 630 may include an operating system (O/S) 632 and one or more application programs, modules, or services for implementing the features disclosed herein, including scripting model 634, avatar generation system 636, scene model 638, and video composer 640. The memory 630 can also maintain portions of item information 642 for use by the other components of the avatar video pipeline. The scripting model 634, avatar generation system 636, scene model 638, and video composer 640 may be examples of other similarly named components described herein, including scripting model 206, avatar generation system 214, scene model 220, and video composer 224 of FIG. 2. The scripting model 634 may be configured to generate a script (e.g., script 208 of FIG. 2) using an item identifier, with the script including both text for a voiceover narration for a video and a description of the video including storyboarding, scene selection, camera view descriptions, scene transitions, and descriptions of possible avatar appearances to use in the video. The avatar generation system 636 can use the script to generate an avatar. The scene model 638 can be configured to generate a background scene (e.g., background scene 222 of FIG. 2) and position the avatar within the background scene. The video composer 640 can be configured to construct the video using the avatar and background scene as well as additional item assets available from the item information 642.

In some embodiments, some, any, all, or various combinations of the functionality described above with respect to the server device can be performed on the user device 604. For example, the user device 604 can implement a scripting model 612 and/or a video composer 614 that can be configured to perform operations similar to those described above with respect to scripting model 634, video composer 640, and/or systems implementing an avatar video pipeline described herein. For example, the scripting model 612 can be configured to generate the script locally at the user device 604 based on item information (e.g., item information 642) sent to the user device 604 from the server device 602. As another example, video composer 614 can be configured to add effects, scene transitions, and camera dynamics to a video based on receiving an avatar and background scene from the server device 602.

FIG. 7 illustrates an avatar 702 placed within a scene 700, according to some embodiments. The scene 700 corresponds to the example described above in which the item that is the subject of video demonstration is a kitchen appliance 704 (e.g., a coffee maker). Based on the item type being a kitchen appliance 704, the scene model (e.g., scene model 402 of FIG. 4) can generate the scene 700 to be a kitchen. The kitchen can include identifiable kitchen elements including countertops 706, 708, cabinets, range, vent hood, and the like. The scene model can embed the avatar 702 within the scene 700 so that the avatar 702 appears to naturally fit in the background, rather than merely being an extra graphical element overlaid in the scene. As depicted in FIG. 7, the avatar 702 is positioned behind the foreground countertop 706 but in front of the background countertop 708 so that the avatar 702 appears to be standing in the kitchen represented in the scene 700. The scene model can also position an image, model, or other representation of the item within the scene. For the kitchen appliance 704, the scene model can determine that a coffee maker is a countertop appliance and position the kitchen appliance 704 on the foreground countertop 706 to provide a view of the kitchen appliance 704 next to the avatar 702 for the video.

Figure 8:
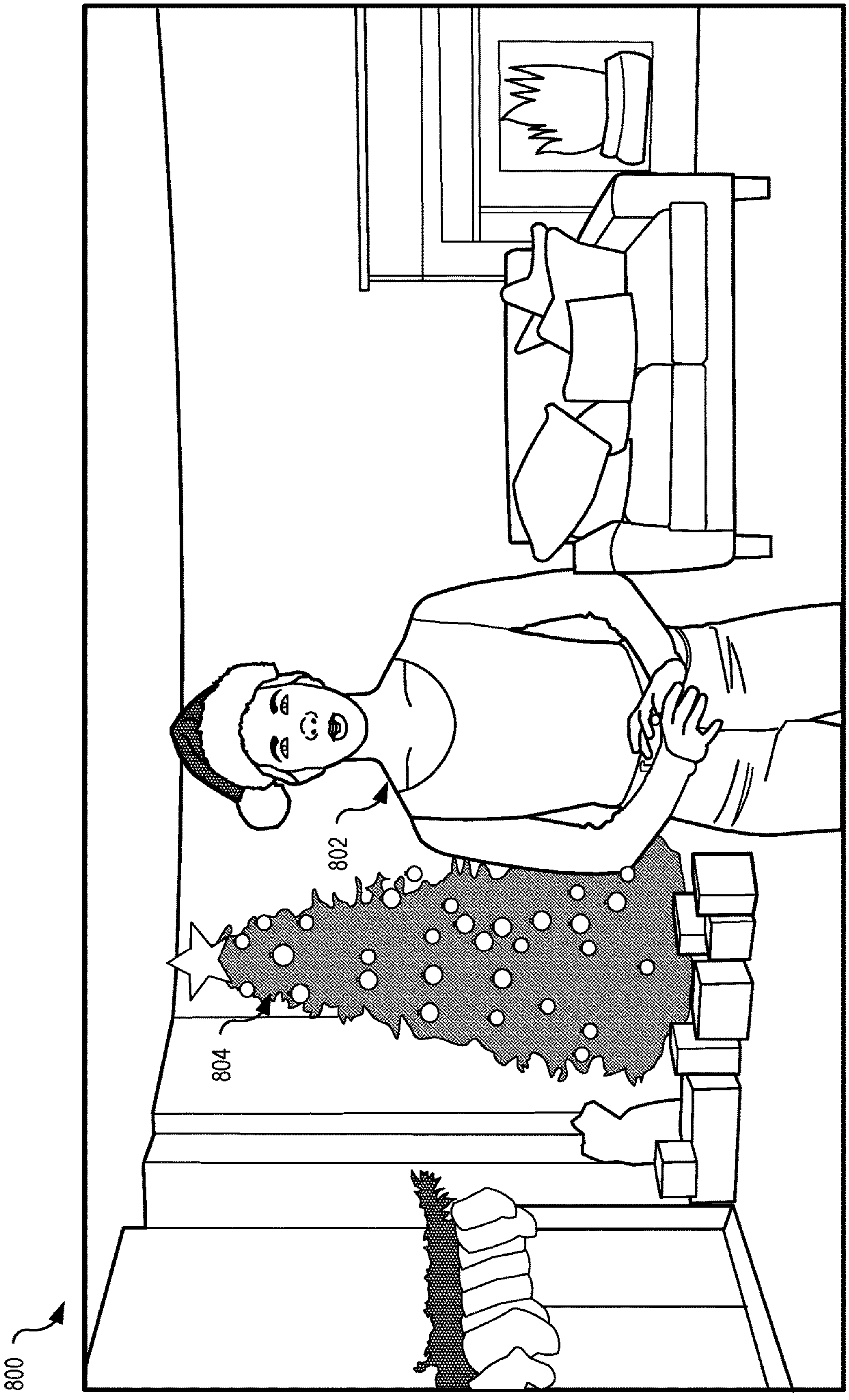
FIG. 8 illustrates a gesture of an avatar within a scene, according to some embodiments.

FIG. 8 illustrates an avatar 802 placed within a scene 800 generated using information associated with an item, according to some embodiments. The scene model (e.g., scene model 402 of FIG. 4) can use the script (e.g., script 208 of FIG. 2) or item information (e.g., item information 204 of FIG. 2) to identify context for the item that is usable to generate a scene that corresponds to a season (e.g., a holiday season, a season of the year) or other aspect that can be used to visually characterize the scene 800. For example, the item may be associated with a particular holiday (e.g., holiday ornaments), so that the scene model can use the type of item to determine the associated holiday and generate the scene 800 accordingly. As another example, the item information can indicate that the item is more popular during a particular season (e.g., snow shovels being viewed and/or sold more frequently during winter), so that the scene model can use the time associated with the item's popularity to determine the associated season. As depicted in FIG. 8, scene 800 is a holiday scene in which at least one element 804 (e.g., a Christmas tree) corresponds to a particular holiday. In cases where the scene model does not determine a particular season, the scene model can generate a scene similar to scene 800 but with different graphical elements that are not associated with a particular holiday. For example, the same avatar 802 may be positioned in a similar scene (e.g., a living room) that lacks the Christmas tree element 804, stockings, Santa hat, and other defining seasonal elements.

FIG. 9 illustrates a gesture 904 of an avatar 902, according to some embodiments. The avatar generation system (e.g., avatar generation system 300 of FIG. 3) can determine at least one gesture 904 for the avatar 902 to perform during a video. The scene model (e.g., scene model 402 of FIG. 4) can position in the avatar 902 in the scene so that the gesture 904 indicates the item 906. As depicted in FIG. 9, the scene 900 is a living room featuring a wall-mounted television for the item 906. In a video demonstrating the item 906, the avatar 902 can gesture 904 to the item 906 when first introducing the type of item and/or describing a particular feature of the item. The avatar generation system can determine based on the script the timing of the gesture 904 to correspond to words spoken by the avatar 902. For example, the script can have the avatar 902 speak the name of the item 906, so that the avatar generation system determines that a gesture 904 that points to the item 906 should occur at the time the corresponding words are spoken in the video.

FIG. 10 illustrates another gesture 1004 of an avatar 1002 within a scene 1000, according to some embodiments. As depicted in FIG. 10, the scene 1000 may have a blank background scene to more fully emphasize the gesture 1004; however, the avatar 1002 may be positioned within any suitable background scene as described herein. The gesture 1004 can include the avatar 1002 holding up digits of the hand to correspond with a number spoken by the avatar 1002. For example, the script used by the avatar generation system to generate the avatar 1002 can include the avatar 1002 speaking the number "three." At the point in the video when the avatar 1002 speaks the number, the avatar 1002 can be animated to perform the gesture 1004 holding up three digits on the hand.

FIG. 11 illustrates an avatar 1102 having customized garments 1104, according to some embodiments. As described above, the avatar generation system can include a garment component that can determine suitable garments for an avatar to wear in a video. For example, the item demonstrated in the video can be a particular garment. Based on the item being a garment, the avatar generation system can generate the avatar 1102 wearing the garment 1104 showing a manufacturer's logo. In some examples, the item itself may not be a garment, but may be associated with a particular brand or manufacturer that can be demonstrated with a garment. The garment component of the avatar generation system can use item information and/or the script to determine that the avatar 1102 should wear garment 1104 in the video due to a brand association with the item. For example, a luxury clothing brand may also be associated with a perfume brand. If the item demonstrated in the video is the perfume, the garment component of the avatar generation system can determine that the brand of the perfume is associated with a garment brand and determine that the avatar 1102 should wear garment 1104 in the video demonstrating the perfume.

Figure 12:
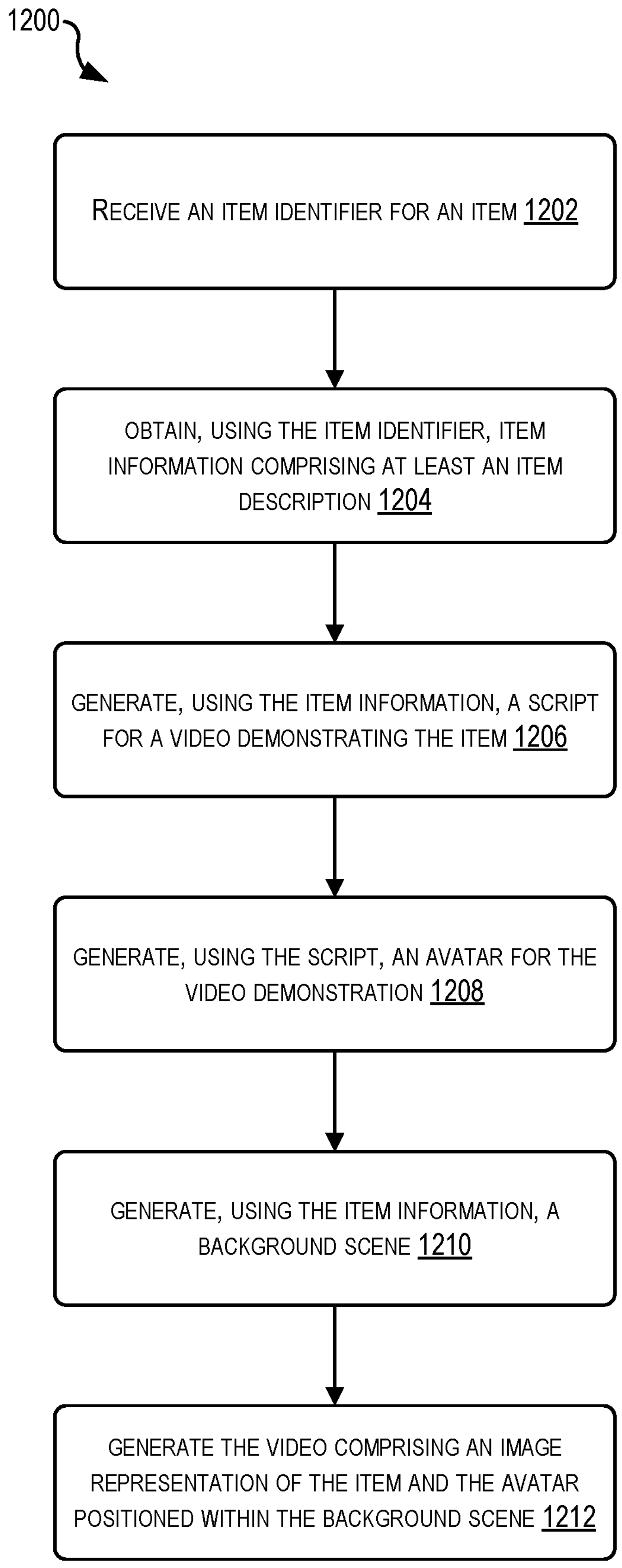
FIG. 12 is a flow diagram of an example process for generating a video for demonstrating an item, according to some embodiments.

FIG. 12 is a flow diagram of an example process 1200 for generating a video for demonstrating an item, according to some embodiments. The process 1200 may be performed by one or more components of a computer system of implementing an avatar video pipeline (e.g., user device 604 and server device 602 of FIG. 6). The process 1200 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 1200 (or any other processes and/or methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1200 may begin at block 1202 with the server device receiving an item identifier for an item. The item identifier may be received from a computing device, including a user device (e.g., user device 604 of FIG. 6) or another service device of a service provider system. The item identifier can uniquely identify an item provided by an online service provider. For example, the item can be a product offered for sale by an online retailer. As another example, the item may be an instructional topic provided to guide a user through a task.

At block 1204, the server device can obtain item information that includes at least an item description. The item description can be text that describes one or more aspects of the item, including an item name, item type, item manufacturer/creator, user reviews and/or testimonials of the item, frequently asked questions and corresponding answers about the item, additional items associated with the item, etc.

At block 1206, the server device can generate a script for a video demonstrating the item. The script may be generated by a machine learning model (e.g., an LLM) that is trained to generate text output based on item information including the item description. The script can include text to be spoken in the video by an avatar. For example, the script can include the text of a narrative voiceover that describes the item in the video. The script can also include a description of the video, including a storyboard, selection of scenes, scene transitions, camera effects to employ in the video, additional assets to be used in the video (e.g., images of the item, video clips of the item in use, etc.), and the like.

At block 1208, the server device can use the script to generate an avatar for the video demonstration. The server device can implement an avatar generation system (e.g., avatar generation system 300 of FIG. 3) to generate the avatar. The avatar can depict a person characterized by at least one avatar property determined from the script. The avatar can also be animated to speak in accordance with a portion of the script and perform at least one gesture. For example, the script can include a narrative voiceover. The avatar's mouth and face can be animated to accurately match the motion of a realistic face and lips producing the words of the narrative voiceover when the avatar's animation is synchronized with audio of the narrative voiceover. In some embodiments, the server device can generate audio from the script using a TTS (e.g., TTS engine 210 of FIG. 2). The audio can include speech corresponding to the text. The audio can be used by the avatar generation system to generate the avatar, including animating the avatar's face and lips to realistically match the audio spoken in the video. In some embodiments, the server device can receive a selection of an additional avatar property. For example, a user interacting with a user device (e.g., GUI 500 of user device 504 in FIG. 5) can provide a selection of an avatar template corresponding to an avatar property (e.g., the avatar having long hair). The avatar generation system can generate the avatar using the additional avatar property in addition to the avatar property. In some embodiments, the item can include an article of clothing. The avatar generation system can generate the avatar wearing the article of clothing in the video.

In some embodiments, the at least one gesture can be determined based on a word in the script. For example, the script can indicate that the avatar will speak the word "three" in the video. The avatar generation system can then animate the avatar to include a gesture in which the avatar holds up a hand with three extended digits at the time when the avatar speaks the word "three."

In some embodiments, animating the avatar to perform the at least one gesture can include determining a corresponding gesture from a training video that depicts a person speaking words and performing gestures, with the audio of the training video synchronized with the gestures performed. The server device can identify a portion of the training audio associated with the corresponding gesture and determine one or more gesture words associated with the corresponding gesture. For example, if the corresponding gesture is an emphatic hand movement, the server device can identify corresponding gesture words that indicate a superlative of the item being described. The server device can then compare the gesture words with the script to identify words in the script associated with the gesture words. Based on the comparison, the server device can animate the avatar with the corresponding gesture at the time when the words in the script are spoken. For example, if the script has the avatar describing features of an item using superlatives (e.g., "best," "fastest,"), the server device can compare these words to words in the training videos that correspond with emphatic hand gestures.

At block 1210, the server device can generate a background scene (e.g., background scene 414 of FIG. 4). The server device can use a scene model (e.g., scene model 402 of FIG. 4) to generate the background scene. The scene model can include a machine learning model (e.g., a diffusion model) that is trained to generate images or three-dimensional representations of a scene based on text input. The scene model can use the item information to generate the scene. The background scene can be contextually related to the item information. For example, the scene model can take as input item information that indicates that the item is a kitchen appliance. The scene model can then generate the scene as a kitchen. In some embodiments, the scene model can use the script to identify a scene context including a season (e.g., holiday season, season of the year) or a typical location for the item (e.g., kitchen for a kitchen appliance). The scene model can use the scene context to generate the background scene.

At block 1212, the server device can generate the video. The video can include an image representation of the item as well as the avatar positioned within the background scene. The server device can use the scene model and a video composer (e.g., video composer 404 of FIG. 4) to generate the video. For example, the video composer can use item information to determine and obtain additional item assets including an image of the item. The video composer can then insert the image of the item in the background scene. Using the kitchen appliance example above, the video composer can obtain an image of the kitchen appliance and place the image in the kitchen scene on a countertop. In some embodiments, the scene model and the video composer can position the avatar and the image representation of the item in the background scene so that the at least one gesture performed by the avatar indicates the item. For example, the avatar can be positioned to the side of the image representation of the item so that the avatar points to the item when speaking the item's name for the first time.

In some embodiments, the server device can determine an additional item identifier for an additional item associated with the item. For example, the item may be associated with a brand used by other related items. Based on the item information identifying the brand, the server device can determine an additional item associated with the brand. In some embodiments, the additional item can be determined using additional item identifiers provided to the server device (e.g., by accepting multiple item identifiers as user input). The additional item can be determined before the script is generated. Using the additional item identifier, the server device can obtain additional item information and generate the script using both the item information for the item and the additional item information for the additional item. In this way, the script my include more comprehensive information about the item with reference to a related item. For example, a kitchen appliance can have accessories that enhance the functionality of the kitchen appliance but that are separate items within the service provider's system. By identifying the accessories as additional items, the script for the video demonstrating the kitchen appliance can make reference to these accessories with respect to providing a description of the capabilities of the kitchen appliance.

Figure 13:
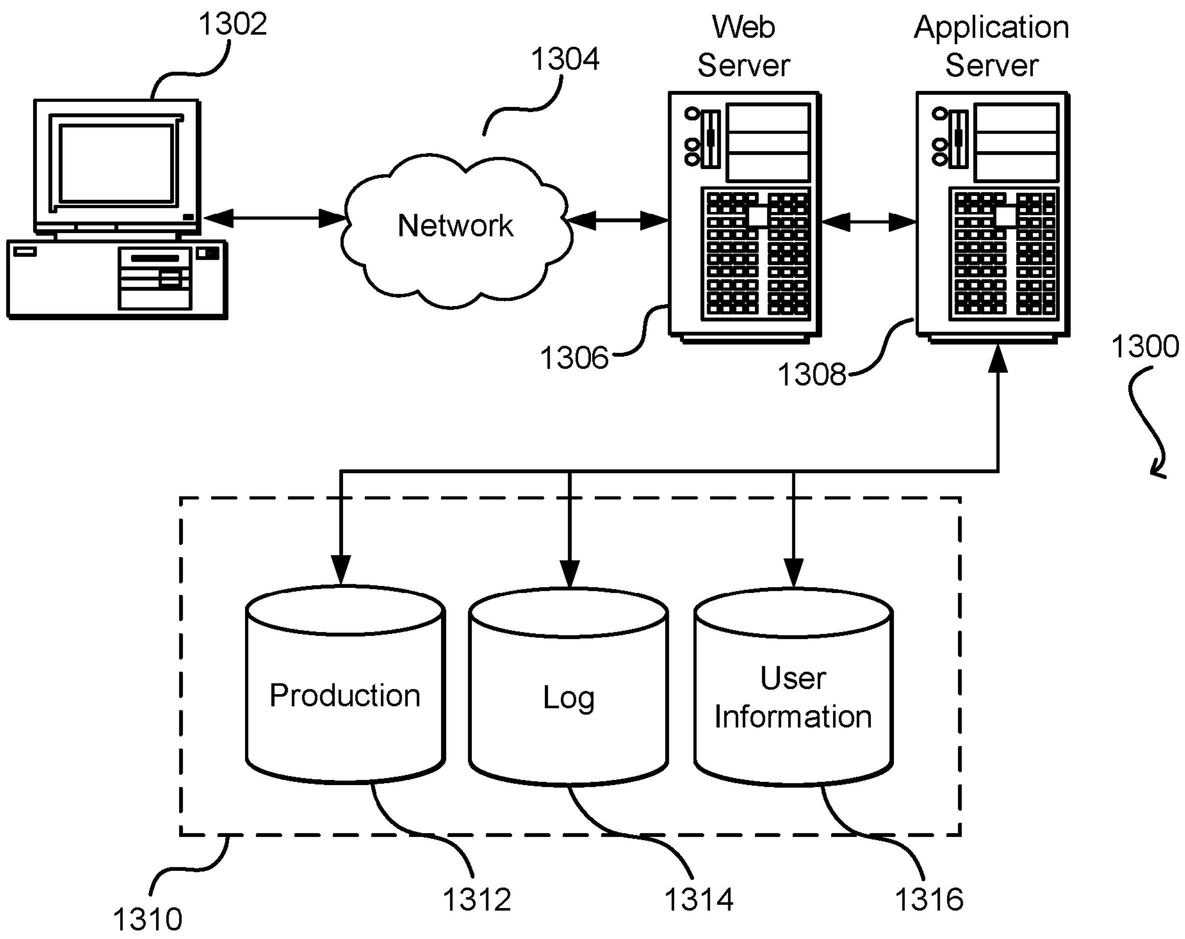
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic user device 1302, which can include any appropriate device operable to send and receive requests, messages, or information over an appropriate network 1304 and convey information back to a user of the device. Examples of such user devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the user device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
- receiving, by a server device from a user device, an item identifier for an item offered by an online retail service provider;
- obtaining, by the server device using the item identifier, item information comprising at least an item description;
- generating, by the server device and using the item information, a script for a video demonstrating the item, the script comprising text to be spoken in the video;
- generating, by the server device, audio from the script, the audio comprising speech corresponding to the text;
- receiving, by the server device from the user device, a selection of an avatar property;
- generating, by the server device using the script and the avatar property, an avatar for the video demonstrating the item, the avatar depicting a person characterized by at least the avatar property and animated to (i) speak in accordance with the audio and (ii) perform at least one gesture, and the at least one gesture determined based at least in part on:
  - identifying a portion of a training video depicting a corresponding gesture and including one or more gesture words in corresponding training audio synchronized with the training video, the one or more gesture words associated with the corresponding gesture; and
  - comparing the one or more gesture words and the text of the script to determine the at least one gesture;
- generating, by the server device using the item information, a background scene; and
- generating, by the server device, the video demonstrating the item, the video comprising an image representation of the item and the avatar positioned within the background scene, the video synchronized with the audio.

2. The computer-implemented method of claim 1, wherein generating the video demonstrating the item comprises positioning the avatar and the image representation of the item in the background scene in accordance with the at least one gesture indicating the item.

3. The computer-implemented method of claim 1, wherein generating the video demonstrating the item comprises generating the avatar within the background scene and positioned behind at least one foreground element of the background scene.

4. The computer-implemented method of claim 1, wherein generating the avatar for the video demonstrating the item comprises generating the avatar using a trained avatar model having a diffusion model configured to execute once to infer a texture for the avatar.

5. A server device, comprising:
- one or more processors; and
- one or more memories storing instructions that, when executed by the one or more processors, cause the server device to:
  - receive, from a computing device, an item identifier for an item;
  - obtain, using the item identifier, item information;
  - generate, using the item information, a script for a video demonstrating the item, the script comprising text to be spoken in the video;
  - generate, using the script, an avatar for the video demonstration, the avatar depicting a person characterized by at least an avatar property determined based in part on the script, the avatar animated to (i) speak in accordance with a portion of the script and (ii) perform at least one gesture, and the at least one gesture determined based at least in part on:
    - identifying a portion of a training video depicting a corresponding gesture and including one or more gesture words in corresponding training audio synchronized with the training video, the one or more gesture words associated with the corresponding gesture; and
    - comparing the one or more gesture words and the text of the script to determine the at least one gesture;
  - generate, using the item information, a background scene contextually related to the item information; and
  - generate the video comprising an image representation of the item and the avatar positioned within the background scene.

6. The server device of claim 5, wherein the one or more memories store additional instructions that, when executed by the one or more processors, cause the server device to further:

generate audio from the script, the audio comprising speech corresponding to the text; and receive, from the computing device, a selection of an additional avatar property, wherein the avatar is further characterized by the additional avatar property and animated in accordance with the audio.

7. The server device of claim 6, wherein the selection of the additional avatar property is based at least in part on audio input.

8. The server device of claim 6, wherein the selection of the additional avatar property is based at least in part on a selection of an avatar template characterized by the additional avatar property.

9. The server device of claim 5, wherein generating the avatar comprises determining the at least one gesture based on a corresponding word in the script.

10. The server device of claim 5, wherein generating the video further comprises positioning the avatar and the image representation of the item in the background scene in accordance with the at least one gesture indicating the item.

11. The server device of claim 5, wherein the training video depicts a person making the corresponding gesture.

12. The server device of claim 5, wherein generating the background scene comprises:

determining, using the script, a scene context for the item, the scene context comprising a season; and generating, using the scene context, the background scene comprising at least one graphical element corresponding to the season.

13. The server device of claim 5, wherein generating the background scene comprises:

determining, using the item information, a scene context for the item, the scene context comprising a typical location associated with the item; and generating, using the scene context, the background scene depicting the typical location.

14. The server device of claim 5, wherein the one or more memories store additional instructions that, when executed by the one or more processors, cause the server device to further:

prior to generating the script, determine an additional item identifier for an additional item associated with the item;

obtain, using the additional item identifier, additional item information for the additional item; and generate the script using the item information and the additional item information.

15. The server device of claim 5, wherein the item comprises an article of clothing, and wherein the avatar depicts the person wearing the article of clothing.

16. The server device of claim 5, wherein the item information comprises at least one of an item name, an item type, an item manufacturer, an item description, or an item review.

17. The server device of claim 5, wherein generating the script for the video comprises:

generating the script in a first language;

receiving, from the computing device, input specifying a second language; and modifying the script to include text in the second language.

18. The server device of claim 5, wherein generating the avatar for the video demonstrating the item comprises:

selecting, based on the avatar property, a previously generated avatar; and animating the previously generated avatar to at least speak in accordance with the portion of the script.

19. The server device of claim 5, wherein generating the video demonstrating the item comprises positioning the avatar and the image representation of the item in the background scene in accordance with the at least one gesture indicating the item.

20. The server device of claim 19, wherein indicating the item within the background scene comprises pointing at the image representation of the item within the background scene.

* * * * *